US011010739B2

(12) United States Patent
Bell et al.

(10) Patent No.: US 11,010,739 B2
(45) Date of Patent: May 18, 2021

(54) APPLICATION PROGRAMMING INTERFACES FOR STRUCTURING DISTRIBUTED SYSTEMS

(71) Applicant: Square, Inc., San Francisco, CA (US)

(72) Inventors: Bruce Bell, New York, NY (US); Kevin Yien, Albertson, NY (US); Karl Westman, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 485 days.

(21) Appl. No.: 15/858,100

(22) Filed: Dec. 29, 2017

(65) Prior Publication Data

US 2019/0205856 A1    Jul. 4, 2019

(51) Int. Cl.
| | |
|---|---|
| *G06Q 20/20* | (2012.01) |
| *G06F 9/54* | (2006.01) |
| *G06Q 20/12* | (2012.01) |
| *G06Q 20/14* | (2012.01) |

(52) U.S. Cl.
CPC .......... *G06Q 20/202* (2013.01); *G06F 9/541* (2013.01); *G06Q 20/12* (2013.01); *G06Q 20/14* (2013.01); *G06Q 20/20* (2013.01)

(58) Field of Classification Search
CPC .................................................. G06Q 20/202
See application file for complete search history.

(56) References Cited

U.S. PATENT DOCUMENTS

| | | | |
|---|---|---|---|
| 6,088,681 A | 7/2000 | Coleman et al. | |
| 7,069,228 B1 | 6/2006 | Rose et al. | |
| 7,606,734 B2 | 10/2009 | Baig et al. | |
| 7,844,497 B2 | 11/2010 | Phillips et al. | |
| 7,895,129 B2 | 2/2011 | Phillips et al. | |
| 8,606,703 B1 | 12/2013 | Dorsey et al. | |
| 8,712,924 B2 | 4/2014 | Marks et al. | |
| 9,230,292 B2 | 1/2016 | Amin et al. | |
| 9,269,103 B1 | 2/2016 | Kumar et al. | |
| 9,299,102 B1 | 3/2016 | Pike et al. | |
| 9,552,564 B1 | 1/2017 | Martenis | |
| 9,858,614 B2 | 1/2018 | Seaward et al. | |

(Continued)

FOREIGN PATENT DOCUMENTS

| | | |
|---|---|---|
| JP | 2021-509193 A | 3/2021 |
| TW | 201604822 A | 2/2016 |

(Continued)

OTHER PUBLICATIONS

Wisnewski, B., et al., "Getting Started with IBM API Connect: Concepts and Architecture Guide," International Technical Support Organization International Business Machines Corporation, Sep. 8, 2016, pp. 1-72.

(Continued)

*Primary Examiner* — A. Hunter Wilder
(74) *Attorney, Agent, or Firm* — Lee & Hayes, P.C.

(57) ABSTRACT

A system and environment to enable entities to utilize delivery services provided by a service provider are described herein. In some examples, the service provider exposes the delivery services to a computing device associated with a merchant, buyer, and/or others using one or more Applicant Programming Interfaces (APIs) provided by the service provider. The one or more APIs may enable merchants and/or others to automatically integrate the delivery services into technologies used by the merchants and/or others in order to facilitate updating content of menus.

20 Claims, 10 Drawing Sheets

(56) References Cited

U.S. PATENT DOCUMENTS

| | | |
|---|---|---|
| 9,934,530 B1 | 4/2018 | Iacono et al. |
| 10,043,149 B1 | 8/2018 | Iacono et al. |
| 10,168,860 B1 | 1/2019 | Bell et al. |
| 2002/0174014 A1 | 11/2002 | Wittrup |
| 2002/0188492 A1 | 12/2002 | Borton |
| 2002/0188495 A1 | 12/2002 | Banerjee et al. |
| 2002/0188517 A1 | 12/2002 | Banerjee et al. |
| 2004/0158494 A1 | 8/2004 | Suthar |
| 2004/0210621 A1 | 10/2004 | Antonellis |
| 2005/0030162 A1 | 2/2005 | Stambaugh |
| 2006/0235755 A1 | 10/2006 | Mueller et al. |
| 2006/0241966 A1 | 10/2006 | Walker et al. |
| 2007/0060358 A1 | 3/2007 | Amaitis et al. |
| 2007/0106411 A1 | 5/2007 | Huber-Buschbeck et al. |
| 2008/0243828 A1 | 10/2008 | Reztlaff |
| 2008/0312987 A1 | 12/2008 | Damodaran et al. |
| 2008/0319864 A1 | 12/2008 | Leet |
| 2009/0048890 A1 | 2/2009 | Burgh |
| 2010/0120538 A1 | 5/2010 | DeWitt |
| 2010/0125886 A1 | 5/2010 | Qian et al. |
| 2010/0312700 A1 | 12/2010 | Coulter et al. |
| 2011/0029359 A1 | 2/2011 | Roeding et al. |
| 2011/0125689 A1 | 5/2011 | Bernard et al. |
| 2012/0191551 A1 | 7/2012 | Lutnick et al. |
| 2013/0042296 A1 | 2/2013 | Hastings et al. |
| 2013/0054863 A1 | 2/2013 | Imes et al. |
| 2013/0278631 A1 | 10/2013 | Border et al. |
| 2013/0317921 A1 | 11/2013 | Havas |
| 2014/0025524 A1 | 1/2014 | Sims et al. |
| 2014/0100971 A1 | 4/2014 | Klearman |
| 2014/0136348 A1 | 5/2014 | Carroll et al. |
| 2014/0156431 A1 | 6/2014 | Morgan et al. |
| 2014/0171039 A1 | 6/2014 | Bjontegard |
| 2014/0188637 A1 | 7/2014 | Balasubramaniam et al. |
| 2014/0214465 A1 | 7/2014 | LHeureux et al. |
| 2014/0214534 A1 | 7/2014 | L'Heureux et al. |
| 2014/0236699 A1 | 8/2014 | Gupta et al. |
| 2014/0257926 A1 | 9/2014 | Rasband |
| 2014/0279276 A1 | 9/2014 | Tolcher |
| 2014/0297470 A1 | 10/2014 | Ramadge et al. |
| 2014/0324607 A1 | 10/2014 | Frehn et al. |
| 2014/0351068 A1 | 11/2014 | Renfroe |
| 2015/0046297 A1 | 2/2015 | Bahrami et al. |
| 2015/0072663 A1 | 3/2015 | Chande et al. |
| 2015/0073925 A1 | 3/2015 | Renfroe |
| 2015/0081478 A1 | 3/2015 | Bahrami et al. |
| 2015/0100152 A1 | 4/2015 | Barragan Trevino et al. |
| 2015/0127496 A1 | 5/2015 | Marathe et al. |
| 2015/0142547 A1 | 5/2015 | Sewell et al. |
| 2015/0142594 A1 | 5/2015 | Lutnick et al. |
| 2015/0169034 A1 | 6/2015 | Huang et al. |
| 2015/0186869 A1 | 7/2015 | Winters et al. |
| 2015/0187027 A1 | 7/2015 | Lowe |
| 2015/0262121 A1 | 9/2015 | Riel-Dalpe et al. |
| 2015/0262208 A1 | 9/2015 | Bjontegard |
| 2016/0012465 A1 | 1/2016 | Sharp |
| 2016/0026958 A1 | 1/2016 | Lee |
| 2016/0029160 A1 | 1/2016 | Theurer et al. |
| 2016/0034876 A1 | 2/2016 | Speiser et al. |
| 2016/0078264 A1 | 3/2016 | Armstrong et al. |
| 2016/0087854 A1 | 3/2016 | Jayanti Venkata et al. |
| 2016/0171584 A1 | 6/2016 | Cao |
| 2016/0180033 A1 | 6/2016 | Rosenberg |
| 2016/0180287 A1 | 6/2016 | Chan et al. |
| 2016/0308798 A1 | 10/2016 | Magistrado et al. |
| 2016/0342972 A1 | 11/2016 | Berlin |
| 2016/0345176 A1 | 11/2016 | DeWitt et al. |
| 2017/0006429 A1 | 1/2017 | Douglas et al. |
| 2017/0055752 A1 | 3/2017 | Mueller et al. |
| 2017/0124670 A1 | 5/2017 | Becker et al. |
| 2017/0243195 A1 | 8/2017 | Xing |
| 2017/0255898 A1 | 9/2017 | Thomas |
| 2017/0278202 A1 | 9/2017 | Mimassi |
| 2017/0278204 A1 | 9/2017 | Mimassi |
| 2017/0287086 A1 | 10/2017 | Lopez et al. |
| 2017/0293950 A1 | 10/2017 | Rathod |
| 2017/0314981 A1 | 11/2017 | Flockenhaus et al. |
| 2018/0025318 A1 | 1/2018 | Baggot et al. |
| 2018/0089658 A1 | 3/2018 | Bell et al. |
| 2018/0122022 A1 | 5/2018 | Kelly et al. |
| 2018/0123804 A1 | 5/2018 | Smith et al. |
| 2018/0261223 A1 | 9/2018 | Jain et al. |
| 2018/0268328 A1 | 9/2018 | Baggott et al. |
| 2018/0364887 A1 | 12/2018 | Bell et al. |
| 2018/0365663 A1 | 12/2018 | Bell et al. |
| 2019/0005388 A1 | 1/2019 | Glyman et al. |
| 2019/0205834 A1 | 7/2019 | Bell et al. |
| 2019/0205857 A1 | 7/2019 | Bell et al. |

FOREIGN PATENT DOCUMENTS

| | | |
|---|---|---|
| WO | 2008/087003 A1 | 7/2008 |
| WO | 2018/063474 A1 | 4/2018 |

OTHER PUBLICATIONS

Non-Final Office Action dated Apr. 6, 2017, for U.S. Appl. No. 15/283,092, of Iacono, J.F., et al., filed Sep. 30, 2016.
Notice of Allowance dated Nov. 22, 2017, for U.S. Appl. No. 15/283,092, of Iacono, J.F., et al., filed Sep. 30, 2016.
International Search Report and Written Opinion for International Application No. PCT/US2017/053976, dated Dec. 5, 2017.
Non-Final Office Action dated Dec. 19, 2016, for U.S. Appl. No. 15/279,650, of Bell, B., et al., filed Sep. 29, 2016.
Final Office Action dated Jun. 19, 2017, for U.S. Appl. No. 15/279,650, of Bell, B., et al., filed Sep. 29, 2016.
Advisory Action dated Sep. 11, 2017, for U.S. Appl. No. 15/279,650, of Bell, B., et al., filed Sep. 29, 2016.
Non-Final Office Action dated Apr. 9, 2018, for U.S. Appl. No. 15/279,650, of Bell, B., et al., filed Sep. 29, 2016.
Non-Final Office Action dated Aug. 10, 2018, for U.S. Appl. No. 15/279,854, of Bell, B., et al., filed Sep. 29, 2016.
Notice of Allowance dated Aug. 15, 2018, for U.S. Appl. No. 15/279,650, of Bell, B., et al., filed Sep. 29, 2016.
Non-Final Office Action dated Oct. 5, 2018, for U.S. Appl. No. 15/279,705, of Bell, B., et al., filed Sep. 29, 2016.
Non-Final Office Action dated Dec. 28, 2018, for U.S. Appl. No. 15/279,782, of Bell, B., et al., filed Sep. 29, 2016.
International Search Report and Written Opinion for International Application No. PCT/US2017/042537, dated Oct. 6, 2017.
McCormack, et. al., "2D LIDAR as a Distributed Interaction Tool for Virtual and Augmented Reality Video Games," IEEE Games Entertainment Media Conference, pp. 1-5 (Oct. 2015).
Statler, S., "Our digital and physical worlds collide—beacons," Air Transport IT Review, Sita, pp. 1-6 (Year: 2016).
Woyke, E., "How Stores Will Use Augmented Reality to Make You Buy More Stuff," MIT Technology Review, pp. 1-4 (Jun. 17, 2016).
Final Office Action dated May 2, 2019, for U.S. Appl. No. 15/279,705, of Bell, B., et al., filed Sep. 29, 2016.
Notice of Allowance dated May 8, 2019, for U.S. Appl. No. 15/279,854, of Bell, B., et al., filed Sep. 29, 2016.
Final Office Action dated Jun. 13, 2019, for U.S. Appl. No. 15/279,782, of Bell, B., et al., filed Sep. 29, 2016.
Supplemental Notice of Allowance dated Mar. 2, 2018, for U.S. Appl. No. 15/283,092, of Iacono, J.F., et al., filed Sep. 30, 2016.
Advisory Action dated Aug. 5, 2019, for U.S. Appl. No. 15/279,705, of Bell, B., et al., filed Sep. 29, 2016.
Advisory Action dated Aug. 14, 2019, for U.S. Appl. No. 15/279,782, of Bell, B., et al., filed Sep. 29, 2016.
Notice of Allowance dated Sep. 10, 2019, for U.S. Appl. No. 15/279,705, of Bell, B., et al., filed Sep. 29, 2016.
Agnes Kanyan et al., "Improving the Service Operations of Fast-food Restaurants," Procedia Social and Behavioral Sciences, www.sciencedirect.com 2015.
Notice of Allowance dated Apr. 10, 2020, for U.S. Appl. No. 15/279,782, of Bell, B., et al., filed Sep. 29, 2016.
Examination Report No. 1 for Australian Patent Application No. 2015264085, dated Jan. 16, 2020, 4 pages.

(56) References Cited

OTHER PUBLICATIONS

Non-Final Office Action dated May 20, 2020 for U.S. Appl. No. 15/858,164, of Bell, B., et al., filed Dec. 29, 2017.
Examiner Requisition for Canadian Patent Application No. 3038958, dated Apr. 24, 2020, 6 pages.
Final Office Action dated Feb. 8, 2019, for U.S. Appl. No. 15/279,854, of Bell, B., et al., filed Sep. 29, 2016.
Non-Final Office Action dated Sep. 30, 2020, for U.S. Appl. No. 15/858,000, of Bell, B., et al., filed Dec. 29, 2017.
Final Office Action dated Nov. 17, 2020 for U.S. Appl. No. 15/858,164, of Bell, B., et al., filed Dec. 29, 2017.
Advisory Action dated Jan. 26, 2021 for U.S. Appl. No. 15/858,164, of Bell, B., et al., filed Dec. 29, 2017.
Non-Final Office Action dated Mar. 8, 2021 for U.S. Appl. No. 15/858,164, of Bell, B., et al., filed Dec. 29, 2017.

APPLICATION PROGRAMMING INTERFACES FOR STRUCTURING DISTRIBUTED SYSTEMS

TECHNICAL FIELD

Buyers often use websites and other technologies to purchase items from merchants for delivery to the buyers. In some instances, a delivery system or service may facilitate deliveries of goods and services offered by a merchant. For example, a delivery service may provide an online site that identifies items from multiple merchants that are available for delivery. A buyer may navigate to the online site, select an item from a merchant, specify an address for delivery, and purchase the item for delivery to the buyer's address. The delivery service may utilize various technologies to fulfill delivery of the item to the buyer. In particular, the delivery service may communicate with an electronic device associated with a merchant and/or an electronic device associated with a customer to deliver the item. Customers also use technologies to interact with merchants, for example to make reservations to purchase items or otherwise reserve their time or service. Similarly, a reservation service may facilitate reservation of a merchant's location for a particular service. However, in cases where the merchant is associated with several of these delivery, reservation, and other third-party services, the merchant has to manually control and coordinate information pouring in from different and disconnected sources and ultimately the simplicity of operation promised by the third party services is rendered useless. Further, the association of the merchant's interface with third party services may disrupt other technologies that are employed by the merchant to run their businesses.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
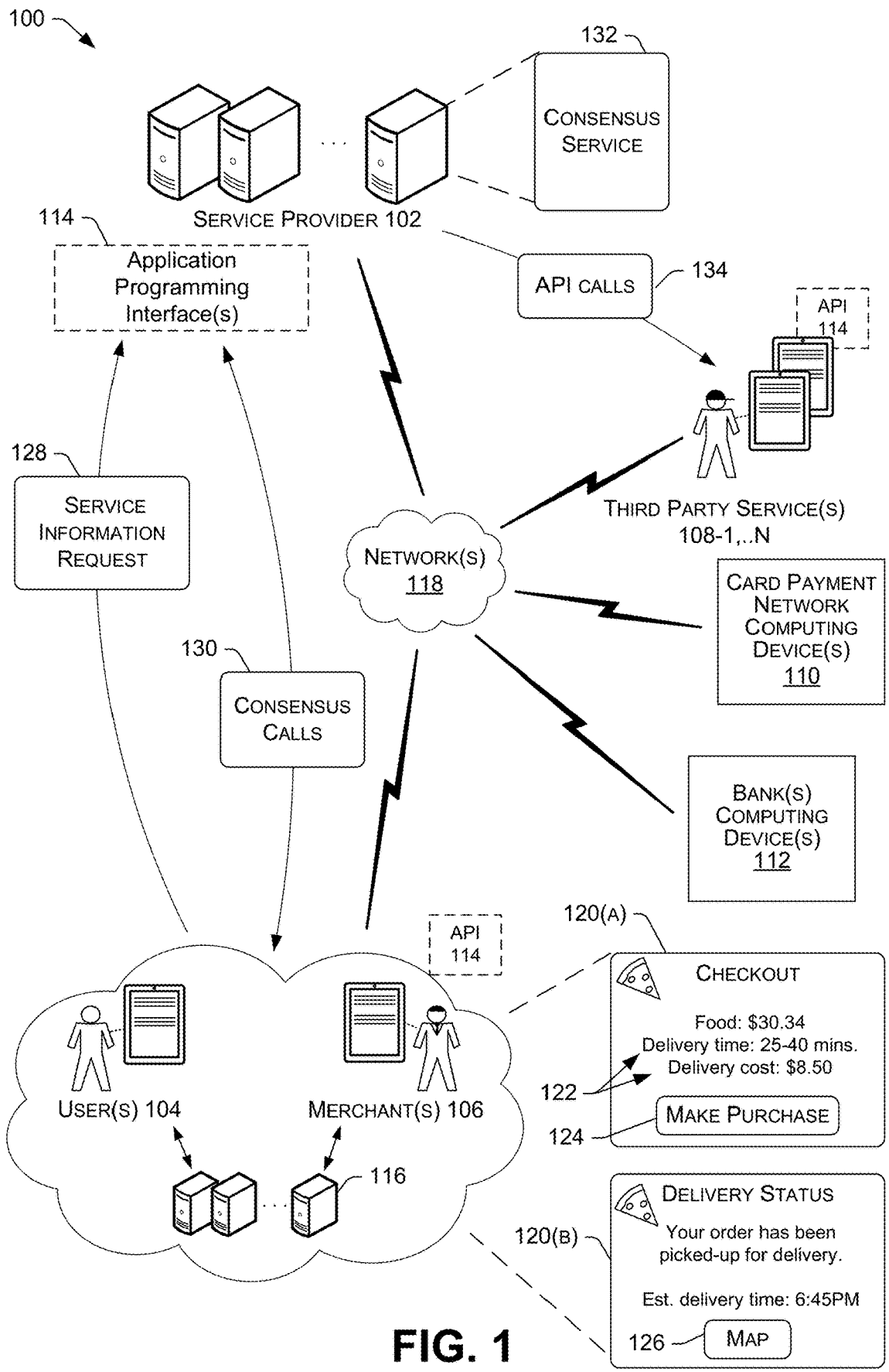
FIG. 1 illustrates an example architecture in which the techniques discussed herein may be implemented.

The technology described herein provides a system and environment to enable entities to structure different third party services, such as applications for delivery services, application for reservation services, applications for third party service services, and so on, via a service provider, such that the entities can communicate with different services without any complicated coding or modifications to entities' source code. In some examples, the service provider exposes a consensus service to a computing device associated with a merchant, buyer, and/or others using one or more Applicant Programming Interfaces (APIs) provided by the service provider. The service provider also exposes the consensus service to a computing device associated with a user, consumer, or developers of third party applications using the APIs. In some instances, the service provider may be a third party that operates remotely and/or independently from the merchant, buyer, and/or others. The one or more APIs may enable merchants and/or others to automatically integrate the consensus service into technologies used by the merchants and/or others in order to facilitate several tasks, such as delivery of items that are offered for acquisition by the merchants, reservation of restaurants for both in-dining or pick up, generation of menus, and so on. For example, the one or more APIs to the consensus service may allow entities to automatically access information regarding delivery of items by a plurality of delivery services (e.g., courier costs, estimated delivery times, etc.), facilitate delivery of items by the delivery service, and use a variety of other functionalities provided by the service provider through the consensus service, such as ordering the preparation of items, scheduling delivery and preparation from the kitchen, scheduling reservations and managing content coming from and going to third party services, and so on.

The implementations are first described with reference to delivery or third party service services. In many examples, the service provider may operate a network of third party service devices to deliver items to buyers and others. Each of the third party service devices may implement a Global Positioning System (GPS) receiver or other location sensor to provide location information to the service provider. The service provider may track the locations of the third party service devices to select a third party service device for a delivery, send updates regarding delivery of items, or otherwise facilitate delivery of items by third party services. Additionally, or alternatively, the service provider may operate in cooperation with a plurality of merchant devices. Each of the merchant devices may implement a Global Positioning System (GPS) receiver or other location sensor to provide location information to the service provider. The service provider may use the locations of the merchant devices to facilitate delivery of items offered for acquisition by the merchants and perform other functionality. Additionally or alternatively, the service provider may also communicate with a plurality of third party service services, which may in turn implement third party service logic and system to receive orders from customers for goods and services offered by the merchant. As described above, the merchants, customers, and third party services and systems may interact with each other through APIs of the service provider's consensus system.

The consensus system then acts as a hub, for example, an order hub to expose an API for integrating third party food ordering, delivery or preparation services, for centralized ordering at the point-of-sale management systems. The consensus system can update the preparation or delivery time across multiple services coming in to automatically calculate new order analytics, such as preparation time, delivery time, order of preparation and so on. The consensus system, in one implementation, can leverage APIs to manage inventory information and provide order information. As one example of the techniques discussed herein, if the merchant has received an order of ten burgers from a third party delivery service and another order of five burgers from a second third party delivery service, the consensus system can update availability, preparation, and delivery times of items in real-time, for the first and second third party delivery service and any other third party delivery service. The consensus system can also predict and forecast employee staffing for ordered items so that the merchant has adequate staff and inventory based on historical orders from various services. The consensus system can also direct auto replenishment of inventory/ingredients, or auto-reorder from vendor, based on status of orders coming in through multiple third party services.

The consensus system can also act as a hub for reservations through utilization of one or more APIs for integrating third party reservation services, for centralized reservations, waitlist and scheduling management. The consensus system can communicate with other third party reservation services to provide a central reservation system and dynamic allocation/reallocation of tables and preferred seating, or even pickup in case dining in is not available. The consensus system monitors and analyzes demand for seating time and accordingly optimizes staffing and ingredients to support diners with preferred servers/chefs for particular reservation or desired menu items. Certain thresholds may be set for the number of items, or the number of customized reservations allowed during a shift, and so on. Further, the consensus system can assign a certain quota of seating for each service based on usage metrics, and transfer a user from one service to another via the APIs to make reservations in case one service cannot furnish the user's request, irrespective of whether the user is subscribed to the other service. Furthermore, the consensus system can be the hub for allocation of the reserved seats and their placement in a manner that maps to the customer profiles and merchant specifications. For example, a frequently visiting customer may be seated in the best region of the restaurant. The consensus system also integrates with other verticals supported by the service provider. For example, the consensus system integrates with onboarding component such that when a new customer reserves at restaurants, the consensus system can create a customer profile to offer one of the many third party services that best suits the customer's profile. The consensus system can also recommend restaurants based on aggregated reviews from all the services, such as by weight or relevance of each third party service.

The consensus system can also be a hub, such as a menu hub, for content aggregation and analysis. In such implementations, the consensus system is a unified manger for dynamic pricing based on how users are ordering on different menus from third party services and accordingly to optimize sales. The consensus system can drive a single menu update that can be applied across all third-party services to harmonize content on such services. The consensus system can also drive multiple updates or service-specific update to take into account the usage metrics across the third party services; for example, the order of menu content can be configured according to popularity or usage of the users across all third party services, on a particular service, and even within the service, the usage within a particular region. For instance, the payment service can reorder the menu based on the order popularity or even behavior of users across different delivery services. For example, since in cases where the payment service may not have access to cart level information from a third party service, the payment service may capture such information once the order is placed at the kitchen. In this manner, the payment service can utilize the exposed APIs to see how a user navigates third party service menus and what items users tend to add but do not checkout with, and then adjust the global menu for the merchant (or their specific menu for a merchant and third party service) accordingly.

As one example of the techniques discussed herein, an application may execute on a computing device associated with a merchant, buyer, and/or others. The application may provide a user interface to enable an individual (e.g., merchant, buyer, etc.) to perform an action, for example place an order for an item offered for acquisition by the merchant, reserve a seat in a restaurant, display content, provide third party service update, and so on. For example, in case of a delivery service, through the user interface, the individual may select an item for acquisition and request that the item be delivered. For example, the individual may place an item in an electronic shopping cart for purchase and indicate an interest in having the item delivered. In some instances, the individual may specify a location of delivery, a location of pick-up, a requested time of pick-up, a number of items being acquired, a size of the item, whether or not the item is associated with a predetermined category, a weight of the item, and so on. In other instances, such information may be automatically determined, obtained from a user profile or merchant profile, and so on.

Upon determining that the individual has an interest in having the item delivered, the application, such as for a third party delivery service, may communicate with a third party service provider using an API provided by the service provider to facilitate delivery of the item via the consensus service associated with the service provider. For example, the application may send a request for a cost of delivery of the item, an estimated amount of delivery time for the item, and so on. The third party service may generate a delivery proposal for using an associated delivery service to deliver the item to the buyer's location, for example to a service provider via an API for consensus service. The delivery proposal may include the cost of delivery, the estimated amount of delivery time, and/or other information regarding delivery of the item. The service provider, via the consensus service, may send the delivery proposal to the application for acceptance or rejection. In some instances, the application presents the information to the individual interacting with the user interface and the individual may provide input to accept or reject the proposal. In other instances, the application may operate according to one or more criteria to automatically accept or reject the delivery proposal (e.g., accept if the cost is below a threshold, accept if the estimated delivery time is below a threshold amount of time, etc.). In any event, the application may use the API to send an indication of acceptance or rejection of the delivery proposal to the third party service.

When the third party service is notified about an acceptance of a delivery proposal, the service provider may perform processing to select a courier for the delivery. For example, the service provider may track the locations of multiple courier devices over time and select a courier that satisfies one or more criteria, such as being within a particular distance to a pick-up location, being available to make a delivery, being associated with a transport vehicle that is able to transport the item, and so on. In some instances, the service provider may use a courier profile, user profile, merchant profile, or other information to select the courier. The service provider may then send a communication to the courier requesting that the courier obtain the item from an establishment of the merchant and transport the item to the location of delivery. During delivery of the item, the service provider may receive information from the courier and/or the merchant (e.g., location information, confirmation that delivery was picked up, etc.) and determine a status of the delivery. The service provider may send the status of delivery to the application, a merchant device, a buyer device, and/or others, so that an individual may be informed of a current state of the delivery.

In many instances, the techniques and environments described herein provide one or more APIs to access consensus service provided by a service provider, to support delivery services, reservation services, and content services. That is, the one or more APIs may provide entities with a flexible structure to integrate various third party services into technologies of the entities. As one example, a merchant may integrate third party services into a website or application operated by the merchant without creating additional components to implement the third party services. By doing so, the website or application may operate according to a thinner implementation (e.g., with less components), in comparison to a website or application that incorporates such features directly into the website or application. This may result in relatively fast implementation of the website or application. Further, the techniques and environments may allow integration of third party services to be implemented across a large variety of contexts (e.g., devices, platforms, etc.). Moreover, the techniques and environments provide a flexible structure to modify the underlying technology, for example the consensus service, used by the service provider to implement the third party services. In other words, the underlying technology of the merchant platforms may be updated in a unified and/or simplified manner, without requiring an update to technologies implemented by merchants, buyers, and/or others. Additionally, the techniques and environments may allow the underlying technology used by the service provider (e.g., including the algorithms, cost schemes, etc.) to be maintained in a secure environment. Also, the data shared by the multiple third party services need not be exposed to the merchants and furthermore, the service provider can create data controls and data encapsulations based on the third party service, environment, location, time of the day, etc., which may be specific to a third party service or a relationship between the third party service and the merchant platforms, such as terminals, applications, kitchen display systems, payment applications and so on.

Advantages of a centralized ordering system include better management of orders, scheduling of orders, and elimination of multiple tablets hanging around walls that list orders for each third party service. With the technology described herein, the merchant can install a single kitchen display system capable of tracking orders coming from different sources and managing the orders, the inventory and timing of the orders in real-time or near-real time.

Advantages of a centralized restaurant system include better management of reservations, tracking of reviews of the restaurants from multiple sources, and elimination of double-booking, under booking or overbooking of restaurants. Even though the description refers to restaurants as an example use-case, it will be understood that the description can be extended to other use cases for reservations and appointments such as salons, hospitals, yoga studios, and so on. With the technology described herein, the reservations can be optimized and seat allocations can be assigned to third party reservation services in real-time, for example based on filling capacity.

Advantages of a centralized content consensus system include better management of content, such as menu, prices, hours of operation, etc., such that all third party services get the same update from the merchant at the same time. With the technology described herein, the content can be harmonized across different third party services so that the prices, brand and look and feel of the merchant are consistently maintained. The consensus system can be a unified manger for dynamic pricing and by tracking order data, such as what and how much are users ordering on different menus, the sales can be optimized. Alternatively, different updates can be pushed, in real-time or near real-time, to the third party services to target different kind of audience, that is adjust menu prices across all menus based on availability/popularity. For example, by determining that the customers ordering on a first third party service order fast food early in the morning, the menu may be configured to present fast food items on the list, in order of preparation time or popularity, for example. Additionally or alternatively, the pricing of the items may be configured to map to the data analytics. In some implementations, the payment flow may be modified once a merchant modifies the item. For example, if a merchant decides to get rid of an item (sometimes referred to as 86-ing an item) from their menu, but if an order is already placed for the item in addition to other items, the consensus system may modify the preparation and payment flow to exclude the nixed item such that the customer is either refunded or never charged for the item. In some implementations, the nixed item may be replaced with another item, for example a similar item, an item of a similar cost, a new offer, a discount, a notification to the customer, and so on.

Further, the technology herein can allow any third party service to be onboarded and integrated for delivery of items from merchants to buyers, or provide any other service without any configuration or exiting relationship with the merchant, as the consensus system through its APIs is capable of interfacing with a variety of hardware and software platforms by porting instructions and data without or little modifications to its source code. Through the interaction of computing devices, mobile devices, and sensors, implementations herein can manage an unpredictable sharing ecosystem in which a large number of entities can participate, to accommodate ever changing circumstances and conditions of the merchants, the buyers, the service region, the third party services, hardware and software platforms, and the third party services themselves.

In various implementations, the consensus system acts as a central server, or a group of servers, capable of ingesting data from various sources through APIs, porting instructions and data into a format that is understood by various services, filtering the data to determine relevance to various merchants and services, and using the analysis to structure or restructure various merchant tasks, such as delivery, reservations, content aggregation, or content display.

Some implementations herein describe a bi-directional API or push-pull API, which means that the information travels in both directions and API end points are associated with both the applications making the communication. However, some implementations may execute a unidirectional API such that the applications may only push the information or pull the information when requested.

This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 in which the techniques discussed herein may be implemented. The architecture 100 includes a service provider 102 associated with a consensus system or application (hereinafter referred to as "consensus service") that communicates with one or more users 104 (hereinafter "the user 104") of applications such as consensus service, buyers at merchant locations, third party services, and so on, one or more merchants 106 (hereinafter "the merchant 106"), one or more third party services 108 (hereinafter "the delivery service 108," "a courier service," "reservation service 108," "the content service" depending on the context, and collectively referred to as third party services), one or more card payment network computing devices 110, and/or one or more bank computing devices 112 to perform a variety of processing. The third party services may also include services offered by the service provider, for example for delivery, reservation or content aggregation and management. In many instances, the service provider 102 may provide one or more Applicant Programming Interfaces (APIs) 114 to enable the user 104 and/or the merchant 106 to access the consensus service provided by the service provider 102. The API can be implemented as a push API, pull API or a combination of both. Accordingly, each of the applications can create or share API endpoints to receive or send updates or both. For example, the Push API enables sending of a push message to a web application a push service, sometimes asynchronously. An application server can send a push message at any time, even when a web application or user agent is inactive. The push service ensures reliable and efficient delivery to the user agent. Push messages are delivered to a Service worker that runs in the origin of the web application, which can use the information in the message to update local state or display a notification to the user. The Pull API works on extracting data, for example based on scheduled jobs set to run at an interval. The system keeps polling the source until certain conditions are met.

Further, in many instances the service provider 102 may facilitate transactions between buyers (a first user) and sellers (a second user), which may include communicating with the one or more card payment network computing devices 110 and/or the one or more bank computing devices 112. Each of the user 104, the merchant 106, and/or the third party service 108 may be associated with a computing device. For example, the third party service may be executing on a user device associated with the user 104 or even merchant device 106. Further, in some instances the environment 100 includes an additional service provider (service provider 116) to communicate with the user 104 and/or the merchant 106 to facilitate the acquisition of an item, as discussed in further detail below. As illustrated, any of the computing devices of the architecture 100 may communicate with each other via one or more networks 118.

A merchant may include any business or entity engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. In addition, a buyer may include any entity that acquires goods or services from a merchant, such as by purchasing, renting, leasing, borrowing, licensing or the like. Hereinafter, goods and/or services may be referred to as items. An item may include a finished product, partially finished product, raw material, and so on. Thus, a merchant and a buyer may interact with each other to conduct a transaction in which the buyer acquires one or more items from a merchant, and in return, the buyer provides payment to the merchant.

A third party service, such as a delivery service, may include any entity engaged in delivering an item. A third party service may obtain an item from a delivery pick-up location (e.g., a location of a merchant) and transport the item to a delivery drop-off location (e.g., a location of a buyer). Some implementations herein provide technological innovations that enable merchants to harmonize delivery requests (also referred to as orders) coming in from different delivery portals 108. With such technology, the merchant is able to coordinate and synchronize orders in relation to inventory, time of order placement, the loyalty rating of the customer and so on.

A third party service, such as a restaurant management service, may include any entity allowing reservations at their location, such as an online or in-person reservation. The term reservation is also intended to include appointment, in person dining, pick up, etc. A third party service may receive a request to make reservation at a merchant location. Some implementations herein provide technological innovations that enable merchants to harmonize reservation requests (also referred to as reservations) coming in from different reservation portals 108. With such technology, the merchant is able to coordinate and synchronize orders in relation to seating availability, preferences of the diners, the time of the day, location, and items available on the menu, and the like.

A third party service, such as a content aggregation service, may include any entity engaged in delivering an item. A third party service may display content without any idea what another third party service is implementing and with no knowledge of what their customers wish to see especially with respect to the merchant's store. Some implementations herein provide technological innovations that enable merchants to harmonize content, such as menus, across different third party services 108. With such technology, the merchant is able to coordinate and synchronize menu and other content in relation to the profile of the third party service, time of the day, location, and other such specifications. The menu or an update on the menu can be pushed as a single update or notification on all third party services at the same time. Alternatively or additionally, menus and other such content, for example display of content, order of items, etc., can be configured according to the relationship of the third party service with the merchant, the availability of items, time of the say, and other such factors.

As noted above, the service provider 102 may expose the one or more APIs 114 of the consensus service to enable a computing device associated with the user 104 and/or the merchant 106 to access, harmonize, normalize, refactor, reconcile, and/or interface with third-party services provided by the service provider 102, such that the merchants or user processes are structured in an optimal manner. For ease of description in the example of FIG. 1, the computing device associated with the user 104 and/or the merchant 106 will be referred to as "the acquisition device." In the example of FIG. 1, the acquisition device communicates with the service provider 102 through the one or more APIs 114 to facilitate an action, such as delivery of an item, seat reservation, menu update. The acquisition device displays various information received from the service provider 102 regarding delivery of the item through an item acquisition interface 120. In this example, an acquisition device executes a delivery service 108-1 for delivery of item, such as pizza, while a delivery service 108-2 for delivery of an item, such as a drink. In some cases, the acquisition device may be different and the merchant may receive two separate delivery requests from different third party services. While placing requests, the service provider, using the consensus service 132, may determine order and timing of the orders that were received. The consensus service 132, using for example machine learning models, determines when the orders should be placed, which items can be clubbed for preparation, and so on. The consensus service 132 schedules the order for a kitchen display system (not shown) associated with the merchant. In this way, the merchant does not need to maintain multiple tablets corresponding to orders coming from different sources. A single tablet indicates the source of order, timing, estimated time of delivery, and a new order of preparation, for example based on timing of orders, source, location, time of preparation etc. Similarly, for reservation requests, the consensus service 132 creates a single list of reservations and how to distribute seating and reservations among users and merchants. Furthermore, the consensus service may interface with the parties to communicate progress of requests in real-time or near real-time.

For example, the acquisition device may communicate with the merchants via the service provider 102 through the one or more APIs 114 while placing an order with the merchant 106. In particular, an individual (the user 104 and/or the merchant 106) may place an item in an online shopping cart for purchase and indicate an interest in having the item delivered. In response, the acquisition device may send a request to the service provider 102 via the one or more APIs 114 for information regarding delivery, reservation, or content management. The service provider 102 may communicate with the merchants or merchant inventory database (local or remote) to generate a delivery proposal regarding delivery of the item by delivery services associated with the service provider 102 and send the delivery proposal, through API calls 134, to the acquisition device. The acquisition device may display information of the delivery proposal via the item acquisition interface 120(a) for acceptance or rejection. As illustrated in FIG. 1, an estimated amount of time to deliver the item and a delivery cost is presented at 122 in the acquisition interface 120(a). The individual may accept the delivery proposal and cause the order to be placed by selecting a button 124.

Further, the acquisition device may communicate with the service provider 102 via the one or more APIs 114 to obtain status updates regarding a delivery of the item ordered by another third party service or another user. In such instances, the service provider 102 may monitor a location of a courier assigned to deliver the item (e.g., the third party service 108), or obtain such information from a third party service associated with the courier, obtain information from a merchant that is selling the item (e.g., the merchant 106), and/or obtain other information. The service provider 102 may determine a status of delivery of the item and send the status of delivery to the acquisition device. The status of delivery may be displayed via the item acquisition interface 120(b). The status may be determined and/or provided to the acquisition device upon request from the acquisition device (e.g., in response to a message sent through the one or more APIs 114), periodically, and/or upon the occurrence of another event. As illustrated in FIG. 1, the item acquisition interface 120(b) may include a button 126 which, when selected, displays a map that shows a current location of the assigned third party service device, a route traveled by the assigned third party service device, a route yet to be taken by the assigned third party service device to pick up or deliver the item, and so on.

In the example of FIG. 1, a delivery service information request 128 represents communications that are sent by the acquisition device to the service provider 102 via the one or more APIs 114, while delivery service information 130 represents communications sent back to the acquisition device from the service provider 102, such as consensus calls to indicate how orders are sequenced, how contemporaneous order requests are handled, fraudulent requests, the delivery times, the seating chart, and other information for a merchant to schedule and organize the operations. The delivery service information request 128 may include a request for information regarding delivery of an item (e.g., cost estimate, delivery time estimate, etc.), an indication of acceptance/rejection of a delivery proposal, a request for information regarding a delivery status, and so on. The delivery service information 130 may include a delivery proposal, information regarding a delivery status of an item, and so on.

In some instances, the acquisition device may operate in cooperation with the service provider 116. The service provider 116, and associated application such as consensus service, may provide resources that operate remotely and/or independently from the acquisition device and/or the service provider 102. In one example, the service provider 116 may be associated with the merchant 106 to manage purchases, inventory, and/or perform other processing. The service provider 116 may provide an online site, operate in cooperation with a local application on the acquisition device (e.g., desktop application, mobile application, etc.), and so on. To illustrate, the service provider 116 may provide an online website for a pizza restaurant and all the delivery services from where the customer can order, so that customers (and/or the pizza merchant) may place orders for pizza with the pizza merchant. As such, communications that are sent and/or received by the acquisition device to the service provider 102 may be routed through the service provider 116. In other words, the service provider 116 may act as an intermediary between the acquisition device and the service provider 102, and also between the merchant and third party services. This kind of architecture allows data to be selectively are privately shared between parties such that only data relevant to the parties is revealed. The service provider 116 may communicate with the service provider 102 via the one or more APIs 114. This may provide a seamless integration of the delivery services offered by the service provider 102 into technologies associated with the merchant 106. In returning to the pizza restaurant illustration above, the website for the pizza restaurant may integrate the delivery services of the service provider 102 by communicating with the service provider 102 via the one or more APIs 114. In some instances, this may occur without the customer knowing that the pizza restaurant is using such delivery services (e.g., so that it appears that delivery is being provided by the merchant 106). In other instances, information may be communicated to the customer indicating that the delivery services are being provided by the service provider 102 (e.g., a pop-up window indicating that the pizza will be delivered by Company X). Although many functions are described as being performed by the service provider 116, any of these functions may be performed by the service provider 102.

The service provider 102 may additionally, or alternatively, perform processing to manage third party services. For instance, the service provider 102 may communicate with the third party service 108 to track a location of the third party service 108, request delivery of an item, receive status information regarding a delivery (e.g., confirmation from the third party service that an item was picked up or dropped off), and so on. In the example environment 100, the service provider 102 receives an indication of acceptance of a delivery proposal or a recommendation proposal from the acquisition device and selects a third party service to deliver the item. The service provider 102 may identify locations of multiple third party services and select a third party service (the third party service 108 in this case) to transport the item to a delivery location. The service provider 102 may then send a delivery request 134 to the third party service 108 requesting delivery of the item and, in return, the third party service 108 may send an indication of acceptance or rejection of the delivery request.

In some instances, the service provider 102 may cause payments to be made to any party within the environment 100. For example, the service provider 102 may cause funds from an account associated with the user 104 to be transferred to an account associated with the merchant 106 as payment for an item. Further, funds may be transferred from an account associated with the service provider 102, the merchant 106, and/or the user 104 to an account associated with the third party service 108 for delivering the item. Payment may additionally be made to the service provider 102 for facilitating the transaction.

As noted above, the service provider 102 may communicate with the one or more card payment network computing devices 110 to conduct a transaction electronically. The one or more card payment network computing devices 110 may be associated with a card payment network (e.g., MasterCard®, VISA®, etc.). The service provider 102 may also communicate with the one or more bank computing devices 112 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in a card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

The one or more card payment network computing devices 110 and/or the one or more bank computing devices 112 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the computing devices of the architecture 100 may communicate via the one or more networks 118. The one or more networks 118 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 118 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 118 in any manner, such as by a wired or wireless connection.

The techniques discussed herein may be implemented in a variety of contexts and/or in a variety of manners. As one example, the techniques may be implemented with a merchant-facing component (e.g., application, online site, interface, etc. designed for a merchant). In this example, the merchant 106 may place an order for a customer. In particular, the customer may enter an establishment of the merchant 106, place a telephone call with the merchant 106, send a notification to the merchant 106 (e.g., email, text message, social media post, etc.), or otherwise communicate with the merchant 106. The merchant 106 may interact with the merchant-facing component (e.g., the item acquisition interface 120 designed for merchant use) to select an item identified by the customer and/or input other information provided by the customer (e.g., a delivery address, etc.). When a delivery proposal is received from the service provider 102, the merchant 106 may communicate the information of the delivery proposal to the customer (e.g., display a screen with a delivery cost, read the delivery cost from the item acquisition interface 120 to the customer, send a notification, etc.). Alternatively, the merchant 106 may refrain from providing the information of the deliver proposal to the customer. For instance, the merchant 106 may decide to offer the delivery for free to the customer, include the cost of delivery in a total cost of the order (e.g., without being itemized), and so on. In any event, the merchant 106 may accept or reject the delivery proposal and/or order the item based on a communication from the customer.

As another example, the techniques may be implemented with a customer-facing component (e.g., application, online site, interface, etc. designed for a customer). In this example, a customer may place an order directly with the merchant 106. In particular, the customer may navigate to an online site associated with the merchant 106, open an application associated with the merchant 106 (e.g., desktop application, mobile application, etc.), and so on, to place an order with the merchant 106. In some instances, the customer may view delivery information during the process (e.g., a delivery cost, estimated amount of time for delivery, etc.), while in other instances the information may not be shown to the customer or included within other information (e.g., a total cost of the order). Further, the customer may view a status update of a delivery through the customer-facing component.

As yet another example, the techniques may be implemented automatically without user input. In this example, information may not be displayed or otherwise communicated to an individual. For instance, one or more criteria may be established for acceptance/rejection of a delivery proposal, so that the delivery proposal is automatically accepted/rejected upon satisfying the one or more criteria. To illustrate, a delivery proposal may be accepted (or rejected) if a cost for delivery is below (or above) a threshold cost, an estimated amount of time of delivery is below (or above) a threshold amount of time, an estimated pick-up time for delivery is before (or after) a particular time, an estimated drop-off time for delivery is before (or after) a particular time, and so on. As such, in some instances, information regarding a delivery may not be displayed through the item acquisition interface 120.

Similarly for the case of reservations, the reservation requests, via API calls, may be initiated by the merchant through merchant devices, customer through customer devices, the third party devices through settings made by the merchant or customer, or automatically through the consensus service, based on machine learning of transactions between merchant and customers. For content aggregation and analysis, the content harmonization requests, such as pushing customized menus or harmonizing menus across different services, the content requests, via API calls, may be initiated by the merchant through merchant devices, customer through customer devices, the third party devices through settings made by the merchant or customer, or automatically through the consensus service, based on machine learning of transactions between merchant and customers.

Figure 2:
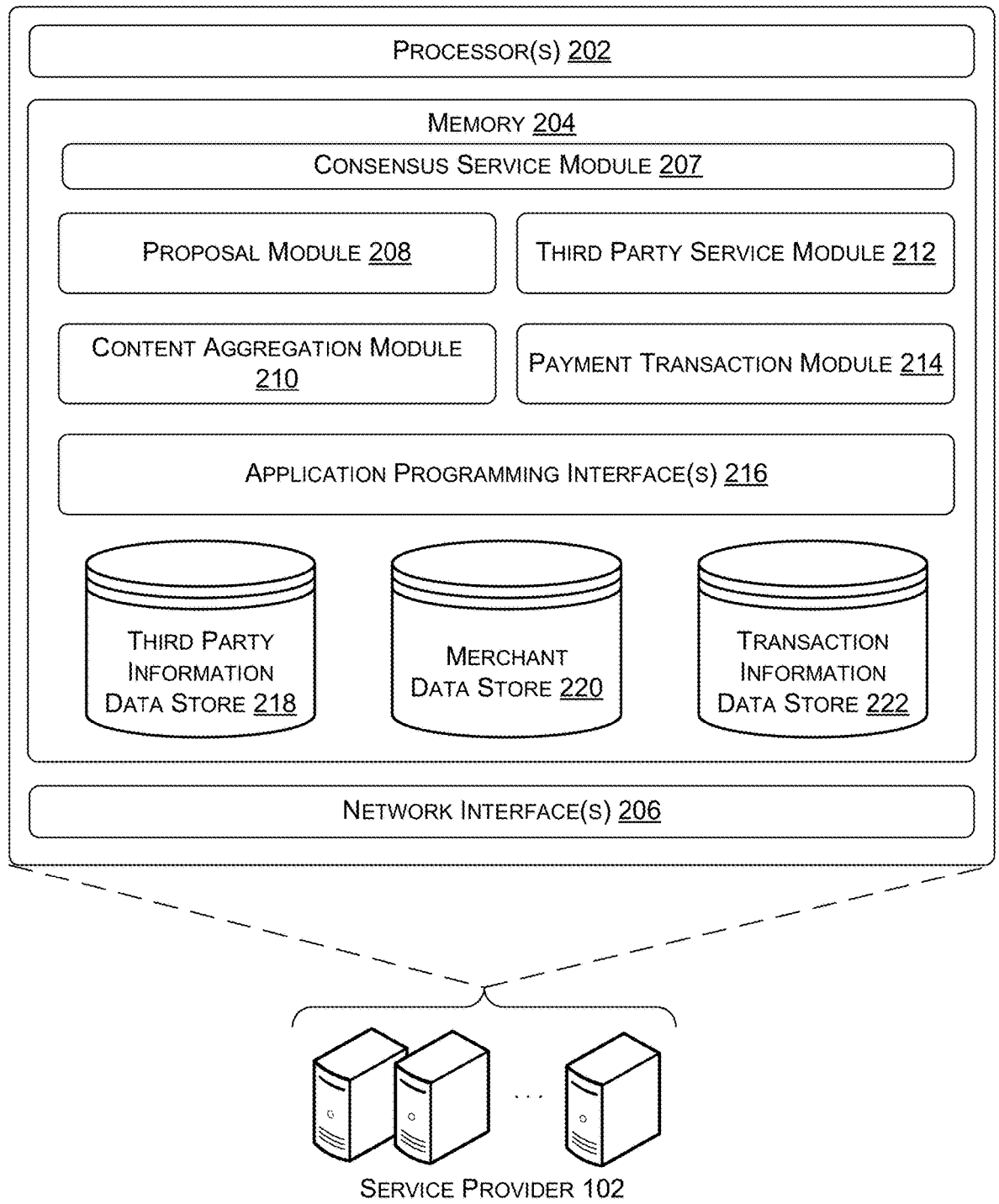
FIG. 2 illustrates example details of a service provider, which facilitates communication with and between multiple services and merchant portals.

FIG. 2 illustrates example details of the service provider 102 (or in some cases, service provider 116) of FIG. 1. The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like. The one or more computing devices of the service provider 102 may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" or components are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated, the memory 204 may include a consensus service 207, a recommendation module 208, a content aggregation module 210, a third party service module 212, and a payment transaction module 214.

The consensus service 207 may interface, through API endpoints, with third party services, and other applications executing on merchant and/or user devices. The consensus service 207 can also be configured to interface with databases associated with the third party services and merchants. In one implementation, the consensus service 207 receives information from the third party services 108 and/or the merchants or user devices, either through a push/pull/or push and pull mechanism to schedule requests in an intelligent way and display the orders to a merchant in a consolidated manner by applying various rules and filters to the incoming requests from different sources. The consensus service can also delegate a request to a specific third party service based on heuristic or machine learning models.

The recommendation module 208 may perform processing to generate a proposal, such as a delivery proposal regarding delivery of an item by delivery services associated with the service provider 102. Another kind of proposal may be a reservation proposal to indicate reservations regarding reservation of a user at a restaurant or a seating chart related to several user reservation requests. Yet another kind of proposal may be a menu update, triggered for example, from a merchant's kitchen display system, to push to third party services. In this case, the information 130 flows from the merchant devices to the third party services, for example executing on the user devices 104. In many instances, the service provider 102 may receive a request for a delivery proposal via one or more Application Programming Interfaces (APIs) 216 and, in response, generate a delivery proposal and send the delivery proposal to the requesting entity. Information included in a request for a delivery proposal is discussed in further detail below in reference to FIG. 3. The recommendation module 208 may generate a delivery proposal based on information included in a request for the delivery proposal, information about a merchant's current or past state of orders, preparation time, etc., and third party service stored in a third party service information data store 218 or elsewhere (e.g., a current location of the third party service, third party service profile information, third party data related to orders processed, order timing, order lags, etc.), information about a merchant stored in a merchant data store 220 or elsewhere (e.g., a current location of the merchant, merchant profile information, etc.), information about a user (e.g., a current location of a user, a user profile, etc.), and so on.

Third party service profile information may include (i) delivery history information for a third party service indicating an average amount of time for the third party service to perform deliveries (e.g., an average amount of time per mile, a total average amount of travel time, etc.), (ii) information indicating whether or not the third party service is on-time for delivery pick-up and/or drop-off, etc., (iii) vehicle information indicating a vehicle or type of vehicle that is used by the third party service to transport items (e.g., a bike, car, van, truck, etc.), (iv) historical location information indicating where the third party service is typically located (e.g., a home address, an establishment where the third party service is located more than a particular amount of time, etc.), and so on.

Merchant profile information may include (i) item preparation information indicating an amount of time (e.g., exact, average, estimated, etc.) to prepare an item or type of item for pick-up (e.g., cook an item, manufacture an item, etc.), (ii) item information regarding items that are offered for acquisition by a merchant (e.g., item identifier, information about an item cost/weight/volume/size/category, etc.), (iii) information regarding a package that is used by a merchant to transport an item (e.g., a size, shape, weight, volume, etc. of a delivery box), and so on.

Example information that may be part of a delivery proposal includes:

- A cost of delivery for an item—a value for using the delivery services of the service provider 102 to deliver an item (e.g., a $6 fee for a third party service to pick up food from a restaurant and deliver it to a customer's location). A cost of deliver may vary based on factors, such as a characteristic of an item—a size, shape, weight, volume, type, etc. of the item (e.g., larger or heavier items may cost more, oddly shaped items may cost more (items that have a predetermined shape), fragile items may cost more than non-fragile items, etc.); information about a third party service (e.g., cost may increase a distance from a third party service to a pick-up location increases, cost may increase as a number of available third party services decreases, etc.); information about a preparation time of an item by a merchant (e.g., cost may increase (or decrease) as preparation time decreases (or increases), due to an urgency to have an item delivered); a location of pick-up (e.g., cost may increase as a distance from a particular point to a pick-up location increases); a location of drop-off (e.g., cost may increase as a distance from particular point to a drop-off location increases); a time of day (e.g., cost may increase during peak delivery times, such as in the evening); and so on.
- An amount of time for delivery of an item (e.g., an estimated amount of time—delivery will take 20-30 minutes). The amount of time may generally be the time for a third party service to retrieve an item and transport the item to the drop-off location. However, in some instances the amount of time may include a time to prepare the item by a merchant (e.g., the amount of time may include a total time from ordering an item until it arrives at a customer's location). An amount of time for delivery may vary based on factors, such as a characteristic of an item—a size, shape, weight, volume, type, etc. of the item (e.g., larger or heavier items may take more time to deliver, oddly shaped items may take more time to deliver (items that have a predetermined shape), fragile items may take more time than non-fragile items, etc.); information about a third party service (e.g., an amount of time for delivery may increase as a distance from a third party service to a pick-up location increases, an amount of time for delivery may increase as a number of available third party services decreases, etc.); a time of day (e.g., an amount of time may increase during peak travel times, such as during rush hour); and so on.
- A pick-up time for delivery of an item (e.g., an estimated time of day, week, month, year, etc. when a third party service will pick up the item). The pick-up time may be when the item is picked up from a merchant's location for delivery to a customer. In some instances, the pick-up time is a window of time (e.g., 2-2:30 PM). Further, in some instances a delivery proposal may include a deadline as to the latest time the third party service would pick up the item. A pick-up time may vary based on factors, such as information about a third party service (e.g., a pick-up time may move farther out as a distance from a third party service to a pick-up location increases, a pick-up time moves farther out as a number of available third party services decreases, etc.); a time of day (e.g., a pick-up time moves farther out during peak delivery times, such as during rush hour); and so on.
- A drop-off time for delivery of an item (e.g., an estimated time of day, week, month, year, etc. when a third party service will drop off the item). The drop-off time may be when the item is dropped off at a customer's location. In some instances, the drop-off time is a window of time (e.g., 3-4 PM). A drop-off time may vary based on factors, such as a characteristic of an item—a size, shape, weight, volume, type, etc. of the item (e.g., larger or heavier items may take more time to deliver, oddly shaped items may take more time to deliver (items that have a predetermined shape), fragile items may take more time than non-fragile items, etc.), information about a third party service (e.g., a drop-off time may move farther out as a distance from a third party service to a pick-up location increases, a drop-off time may move farther out as a number of available third party services decreases, etc.); a time of day (e.g., a drop-off time moves farther out during peak delivery times, such as during rush hour); and so on.
- A time at which a delivery proposal expires. In some instances, the delivery proposal may expire if not accepted by a particular time (e.g., time of day, day of week, month, year, etc.). As such, the delivery proposal may be associated with a time of expiration (e.g., tomorrow at 2 PM, 2 hours from receipt of the delivery proposal, etc.).
- A third party service capable of furnishing the order, for example if the third party service through which the order was placed is unable to due to courier or other technical difficulties.
- A sequence of items for the kitchen display system, where the items are either arranged by the order ID or item preparation time, to enable the merchant to keep a single tablet for orders from different sources.
- A preparation timeline or delivery timeline for the kitchen display system to indicate to the third party services updates on orders.

The content aggregation module 210 may provide analytical information based on aggregated data, such as menu updates, delivery information regarding progress of a delivery, reservation lists, etc. For example, the content aggregation module 210 may receive a request via the one or more APIs 216 for a delivery status update and, in response, generate information regarding a status of delivery and send the information to the requesting entity. In other examples, such information regarding the status of delivery may be generated and sent automatically and/or upon the occurrence of another event. The content aggregation module 210 may generate information regarding a status of a delivery based on various information, such as a location of a third party service, an indication from a third party service regarding confirmation of pick-up of an item at a merchant's location and/or drop-off at a customer's location, a communication from a merchant indicating confirmation of pick-up, a communication from a merchant regarding a status of preparing an item (e.g., an amount of time left to cook a dish), and so on. As such, the content aggregation module 210 may communicate with the third party service module 212 to receive location information regarding couriers.

The third party service module 212 may manage third party services. For example, the third party service module 212 may track locations of couriers associated with third party services (before, during, and/or after delivery), select a third party service for delivery, communicate with the third party service to facilitate the delivery, provide updates regarding a status of delivery, predict third party service travel times to various delivery locations for various times of the day and/or days of the week, and so on. To do so, the third party service module 212 may analyze various information, such as information included in a request for a delivery proposal, information included in a request for a delivery status update, information about a third party service stored in the third party service information data store 218 or elsewhere (e.g., a current location of the third party service, third party service profile information, etc.), information about a merchant stored in the merchant data store 220 or elsewhere (e.g., a current location of the merchant, merchant profile information, etc.), information about a buyer (e.g., a current location of a buyer, a user profile), and so on. In some instances, the third party service module 212 may manage third party services through activation, movement, positioning, and/or deactivation, for example through APIs.

As one example, the third party service module 212 may select a third party service to facilitate its couriers to transport an item from a merchant to a buyer. In some instances, a third party service is selected in response to receiving an acceptance of a delivery proposal via the one or more APIs 216. In other instances, a delivery is arranged upon the occurrence of other events. The third party service module 212 may use various information to select a third party service, such as a location of the third party service relative to a location of a merchant (e.g., select a third party service that is closest to a pick-up location), an availability of the third party service (e.g., select a third party service that is available), a type of vehicle that is used by the third party service to transport items (e.g., select a third party service that is able to transport the type of item being delivered), information about an item being delivered (e.g., a size, shape, volume, type, etc.), and so on. The third party service module 212 may then communicate with the selected third party service to arrange the delivery. The service provider 102 may provide information regarding a number of items to transport, a location of a merchant (or multiple merchants, if multiple items are going to be delivered), a requested time of pick-up and/or drop-off, and so on. If it is determined that multiple trips are required for the delivery (e.g., due to a number of items being delivered, a size of items being delivered, a carrying capacity of a third party service, etc.), the third party service module 212 may inform a third party service of the multiple trips and/or send instructions to multiple third party services to make the delivery. Further, the third party service module 212 may inform a third party service that a delivery that is not urgent and may be performed during a downtime period in which less than a threshold number of deliveries are scheduled for the third party service. The third party service module 212 may inform the third party service of the time period (e.g., "perform the delivery between 8 pm and 10 pm any night this week") or the third party service may make the delivery as time frees up throughout a day, week, etc. In many instances, the third party service module 212 communicates with third party services through non-API channels and/or separate channels than the one or more APIs 216 used for exposing delivery services to entities.

The payment transaction module 214 may facilitate payment transactions between merchants, users, and/or third party services. For example, the transaction module 214 may receive orders regarding transactions, process the transactions, generate and/or store transaction information regarding the transactions, and so on. During a transaction, a user (e.g., customer) may acquire an item from a merchant by purchasing, renting, leasing, borrowing, licensing, or the like. The item may refer to a good and/or a service offered by a merchant. When paying for the transaction, the user can provide the amount of payment that is due to the merchant. In some instances, the transaction may be processed by electronically transferring funds from a financial account associated with the user to a financial account associated with the merchant. In some examples, the transaction module 214 may be implemented by one or more computing devices that are configured to perform secure electronic financial transactions.

The payment transaction module 214 may facilitate payment transactions initiated through a variety of channels. As one example, a user may interact with a user device to place an order with a merchant. Here, the service provider 102 may communicate with the merchant to fulfill the order (e.g., inform the merchant that an order has been placed, ask the merchant to fulfill an order, etc.). As another example, a merchant may interact with a merchant device to place an order on behalf of a user. Here, the user may communicate with the merchant via telephone, in-person, a notification (e.g., text message, email, social media, etc.), and so on, to indicate a desire to place an order with the merchant. In any of these examples, a user may provide payment at any time, such as at the time of placing an order, while an item is being delivered, at the time of drop-off (e.g., interacting with a third party service device), and so on.

A user may provide payment through various method, such as cash, check, a payment card, Near Field Communication (NFC), Bluetooth®, an account, electronic payment, and so on. In some instances, the payment transaction module 214 enables card-less payments for transactions between a user and a merchant based on interaction of the user with a user device and interaction of the merchant with a merchant device. Accordingly, in some examples, a card-less payment transaction may include a transaction conducted at a POS location during which an electronic payment account of the user is charged without the user having to physically present a payment card to the merchant at the POS location. Consequently, the merchant need not receive any details about the financial account of the user for the transaction to be processed. As one example, the electronic payment may be charged to a credit card issuer or credit card number that the user provided when signing up with the service provider 102 for an electronic payment account. As another example, the user may have a quantity of money pre-paid in an account maintained for use in making the electronic payments. Other variations will also be apparent to those of skill in the art.

In some instances, the payment transaction module 214 may store transaction information in a transaction information data store 222. The transaction information may be received from a merchant device, buyer device, third party service device, and/or generated by the service provider 102. The transaction information may include information regarding the time, place and/or the amount of the transaction, information related to the item acquired (e.g., information identifying the item sold), a type of payment being used (e.g., cash, check, payment card, electronic payment, etc.), as well as additional information, such as buyer information. For instance, if a payment card is used, the transaction information can include data stored in the payment card (e.g., Track 1 data (cardholder name, card number and other card information)). In addition, when completing the transaction, a buyer may sometimes provide a receipt email address for receiving a receipt through email. Other examples of transaction information that can be captured include item information (e.g., an itemized listing of the items being acquired, the price being paid for each item, descriptors of the items (size, flavor, color, etc.)), geolocation data indicating a geographic Point of Sale (POS) location of a particular transaction, online/offline card data, data describing a merchant (e.g., a merchant identifier, a merchant category code (MCC), etc.), information included in a request for a delivery proposal, information included in a delivery proposal, any type of data that is received upon a buyer's authentication into a social network, and/or various other types of information. In some instances, transaction information may be used to store information about a merchant in the merchant data store 220 (e.g., a cost of an item offered by a merchant may be obtained from transaction information regarding a transaction at the merchant's establishment).

While FIG. 2 illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

Figure 3:
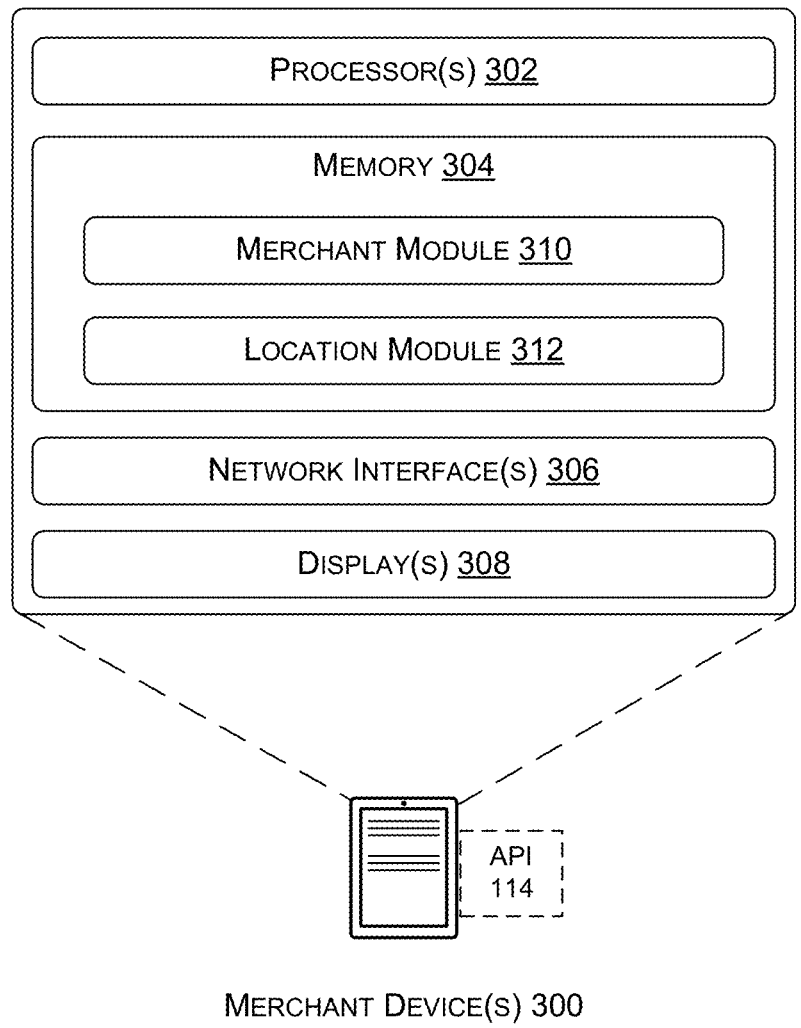
FIG. 3 illustrates example details of a merchant device, which receives data from multiple, different and distributed services through the service provider.

FIG. 3 illustrates example details of a merchant device 300. For example, the merchant device 300 may be employed by the merchant 106 of FIG. 1. The merchant device 300 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some In one implementation, the merchant device 300 can execute a third party service, such as a delivery service, reservation service, menu service, review service, and so on. The merchant device 300 can, in one implementation, interface with the third party service and other services through one or more consensus services 207. In one example, the service provider provides API endpoints to communicate with the third party service and the merchant device 300, which may or may not provide API endpoints 114 for the service provider to access. Accordingly, the service provider's consensus service 207 may be able to pull, push, or push and pull data from the external services.

The merchant device 300 may also be associated with additional devices to manage incoming orders, reservations, appointments, notifications, updates, alerts and so on. For example, the merchant device 300 may be associated with one or more tablets connected to or including a kitchen display system. Typically, the kitchen display system is configured to display orders coming in from various third party services on a tablet of their own. However, using the implementations described herein, the tablets may be integrated into one such that all orders irrespective of the source are synchronized and structured to be presented and handled on a single tablet. Similarly, for reservations, the merchant device 300 may be associated with an onsite reservation system that tracks the physical space vis-à-vis occupancy/availability.

The merchant device 300 may include one or more processors 302, memory 304, one or more network interfaces 306, and one or more displays 308. The one or more processors 302 may include a central processing unit (CPU), a graphics processing unit (GPU), a microprocessor, a digital signal processor, and so on. The one or more displays 308 may include a touch screen, a Liquid-crystal Display (LCD), a Light-emitting Diode (LED) display, an organic LED display, a plasma display, an electronic paper display, or any other type of technology. Although not illustrated, the merchant device 300 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The merchant device 300 may additionally include, or be associated with, input device(s) such as a keyboard, a mouse, a pen, a voice input device, a touch input device, etc. The memory 304 may include a merchant module 310 and a location module 312.

The merchant module 310 (and/or the location module 312) may represent a merchant-facing component that may generally be used by a merchant. Although in some instances a customer may interact with the merchant-facing component (e.g., to confirm payment, provide delivery information, or provide other input). The merchant module 310 may perform various processes to assist a merchant in facilitating transactions with customers, managing deliveries, managing inventory, and so on. The merchant module 310 may provide various interfaces and/or dashboards. In some instances, the merchant module 310 may be referred to as an application, such as an acquisition application for delivery orders, reservation orders, and menu updates/preferences.

The merchant module 310 may communicate with the service provider 102 to use delivery services provided by the service provider 102. As one example, a merchant may interact with an item acquisition interface (e.g., the item acquisition interface 120) provided by the merchant module 310 to place an order for a customer. If the merchant module 310 determines that a delivery may be requested (e.g., automatic determination, based on the customer indicating a desire to have the order delivered, etc.), the merchant module 310 may generate a request for a delivery proposal and send the request to the service provider 102 via one or more APIs to request information regarding use of delivery service recommended by the service provider 102. The information of the request may be provided by the customer or the merchant, retrieved from a data source (e.g., a user profile, a merchant profile, etc.), and so on. Example information that may be part of a request for a delivery proposal includes:

- A pick-up location for an item—a location where an item is retrieved from a merchant for delivery to a customer. The pick-up location may generally be a merchant's location (e.g., establishment), although any location may be used, such as a warehouse, residence, PO box, street corner, etc. The pick-up location may be stationary or mobile (e.g., in the case of a moving merchant).
- A drop-off location (also referred to as the location of delivery)—a location where an item is delivered to a customer. The drop-off location may generally be a customer's location, such as a residence, PO box, street corner, establishment where a customer is currently located, etc. The drop-off location may be stationary or mobile (e.g., in the case of a moving customer).
- A requested time of pick-up—a time of day, week, month, year, etc. to retrieve an item from a merchant for delivery. The requested time of pick-up may be a specific time, a window of time, and so on. In some instances, the requested time of pick-up may be as soon as possible (e.g., in the case when an item is already made or in other situations). If a pick-up time is not specified in a request for a delivery proposal, the service provider 102 may assume that the pick-up time is as soon as possible, for example.
- A number of items being acquired—a quantity of items being purchased from a merchant. In some instances, the service provider 102 may use this information to determine a size of an order (e.g., how much space is needed to transport the order).
- An item identifier identifying an item that is being acquired. In some instances, the service provider 102 may use this information to lookup information about the item to determine how much space is needed to transport the order, a type of vehicle that is needed to transport the item, a type of the item (e.g., fragile vs. non-fragile, perishable vs. non-perishable, etc.), and so on.
- A characteristic of an item that is being acquired (e.g., size, shape, weight, volume, type, category, etc.). In some instances, the service provider 102 may use this information to determine how much space is needed to transport the item.
- A tag associated with an item being acquired (e.g., a tag indicating a particular category). For example, an item may be tagged with a predetermined label that is associated with a category of food that requires special handling for delivery (e.g., pizza or soup, which may need to be kept warm and/or upright; catered food, such as food on a tray, which may require special handling; a television, which may need to be handled with care; etc.). In some instances, the service provider 102 may use this information to determine how much space is needed to transport the order, a type of vehicle that is needed to transport the item, a type of the item (e.g., fragile vs. non-fragile, perishable vs. non-perishable, etc.), and so on.
- A value of an order (e.g., a cost of an item or order).
- Pick-up instructions regarding an item. For example, a merchant may specify that a bicycle may be picked up for delivery at the back of a store.
- Delivery instructions regarding an item. For example, a customer may request that the item be delivered between a particular window of time, at a particular spot on a customer's property, with a particular type of vehicle, by a particular third party service, and so on.
- Customer contact information (e.g., telephone number, email address, a customer's geolocation, etc.). As one example, customer contact information may include a customer's street address.

Although the merchant module 310 is discussed as providing the information included in a request for a delivery proposal, in some instances the information may be determined (at least in part) at the service provider 102 (e.g., the service provider 102 may receive an item identifier and lookup an item size, weight, etc.).

After submitting a request for a delivery proposal to the service provider 102, the merchant module 310 may receive the delivery proposal from the service provider 102. In some instances, information from the delivery proposal is conveyed to the customer. For example, the merchant may inform the customer of a cost of delivery, an estimated delivery time, and/or any other information. In other instances, information from the delivery proposal may not be presented to the customer. For example, the merchant may view the information of the delivery proposal and/or include the cost in a total cost of the order. As such, in some instances it may appear to the customer that the delivery is being handled by the merchant. In any event, the merchant module 310 may send an indication of acceptance or rejection of the delivery proposal to the service provider 102 via the one or more APIs.

Thereafter, the merchant module 310 may communicate with the service provider 102 via the one or more APIs to provide and/or receive information on a status of a transaction. For example, the merchant module 310 send information indicating where an item is in the preparation process (e.g., almost finished, done, entering the oven, bagged and ready for pickup, etc.). In another example, the merchant module 310 may receive information from the service provider regarding a status of delivery by delivery services (e.g., a specific location of a courier of a third party service, how far away a third party service is, whether or not an item has been dropped off, courier associated with a third party service is in-transit to the pick-up location, etc.).

The merchant module 310 may receive orders through various channels. For instance, the merchant module 310 may receive a first order that is placed by a merchant on behalf of a customer based on a telephone conversation between the merchant and the customer and a second order that is placed by another customer on a customer application. The second order may be received from the service provider 102 and/or another party, such as a service provider associated with the merchant. In any event, the orders may be managed by the same merchant module 310 via service provider's API. That is, the merchant module 310 may monitor preparation of the orders, present information regarding a progress of preparation of the orders, present information regarding a delivery status of the orders, and so on. In many instances, information about the orders is presented through an interface with information that designates the orders as originating from different channels.

The merchant module 310 may apply one or more schemes to provide payment for delivery services used by the service provider 102. As one example, cost of delivery for using the delivery services of the service provider 102 may be billed to a customer (e.g., directly on an item-by-item basis, on a monthly basis, etc.). As another example, a merchant may decide to provide the payment for the cost of delivery (e.g., not charge the customer) in each instance or when one or more criteria are satisfied, such as an order having more than a threshold number of items, an order having an amount that is more than a threshold amount, the customer being associated with a particular status (e.g., the customer having paid for a monthly subscription for delivery services or having purchased a particular number of items over time), and so on.

A merchant may be billed by the service provider 102 for use of consensus service that connects several delivery services in various manners, such as monthly, on an item-by-item basis, balancing an amount that is owed to the merchant by the service provider 102 (e.g., subtract costs for delivery services from an amount the service provider 102 owes the merchant), and so on.

The merchant module 310 may additionally, or alternatively, perform other processing. In one example, the merchant module 310 may facilitate transactions with customers by accepting payment from customers (e.g., via a card reader, NFC connection to a customer device, Bluetooth® connection to customer device, etc.), providing receipts for items (including printing receipts), receiving input from customers for items being acquired by the customers (e.g., confirmation, signature for credit card, etc.), and so on. In another example, the merchant module 310 may enable a merchant to manage inventory by informing the merchant of inventory levels (e.g., number of items currently in-stock), order additional inventory, view notifications from the service provider 102 regarding inventory, offer inventory for acquisition to others, seek financing for inventory, and so on. In yet another example, the merchant module 310 may provide data analytics for sales, inventory, or other information.

Although the functionality of the merchant module 310 is discussed as being included in a single component, the functionality may be divided into any number of components. In some instances, the functionality is divided into separate applications, which may be linked to each other (e.g., access one application by selecting a link within another application).

The location module 312 may determine a location of the merchant device 300. In some instances, the location is provided to the service provider 102, or used locally, to facilitate various functions, such as determining a location of a merchant, processing of transactions when a customer is located within a particular proximity to the merchant device 300, etc. The location module 312 may determine a geographic location of the merchant device 300 from geo-location techniques (e.g., satellite-based systems—global positioning system (GPS)), cell tower location data, wireless access point location data, wireless beacon location, and so forth. As such, the location module 312 may utilize data from a location sensor of the merchant device 300, such as a GPS receiver or communication interface that can determine (e.g., from cell towers or wireless access points) a geographic location of the merchant device 300.

In some types of businesses, the merchant device 300 may be associated with a store or other place of business of a merchant, and thus, may be a fixed location that typically does not change on a day-to-day basis. In other types of businesses, however, the merchant device 300 may move locations from time to time, such as in the case where the merchant operates a food truck, is a street vendor, a cab driver, etc. or has an otherwise mobile business (e.g., in the case of merchants who sell items at buyer's homes, places of business and so forth).

Figure 4:
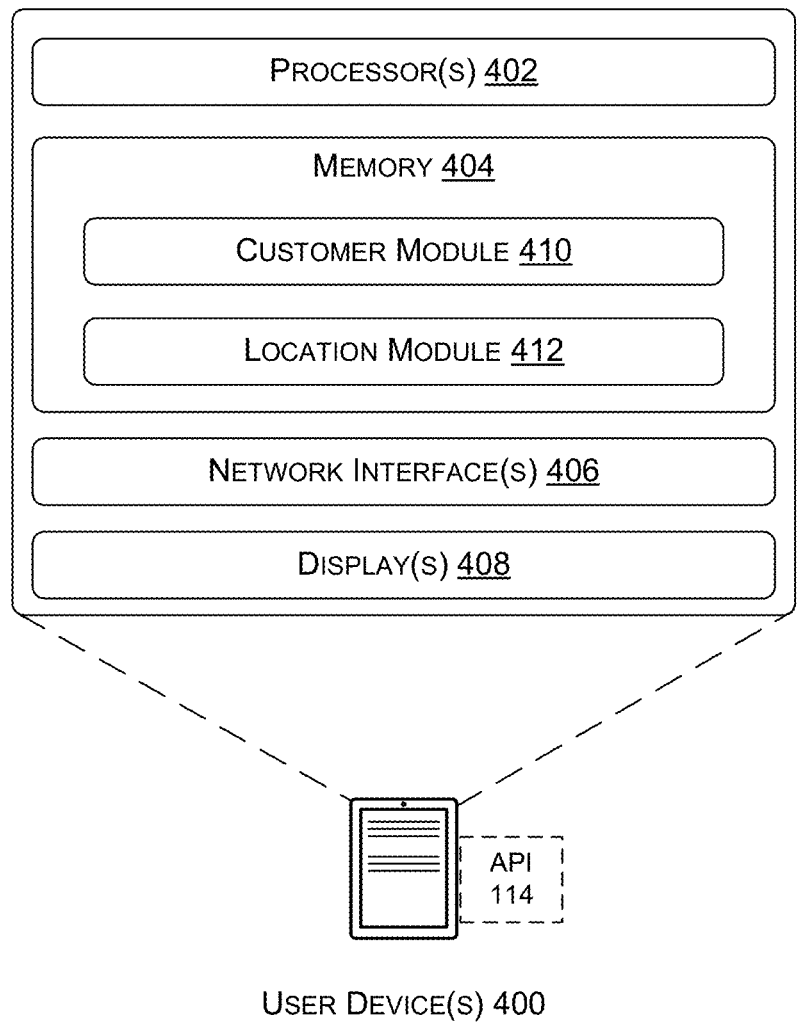
FIG. 4 illustrates example details of a user or consumer device, which hosts or accesses, in some implementations, web or native third party services.

FIG. 4 illustrates example details of a user device 400. For example, the user device 400 may be employed by the user 104 of FIG. 1. The user device 400 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the merchant device 300 may be a mobile device. In one implementation, the user device 400 can execute a third party service, such as a delivery service, reservation service, menu service, review service, and so on. The user device 400 can, in one implementation, interface with the merchant services, such as merchant device 300, through one or more consensus services 207. In one example, the service provider provides API endpoints 114 to communicate with the third party service and the merchant device 300, which may or may not provide API endpoints for the service provider to access. Accordingly, the service provider's consensus service 207 may be able to pull, push, or push and pull data from the user devices. The third party service may be hosted on a third party server, similar to service provider, for example.

The user device 400 may include one or more processors 402, memory 404, one or more network interfaces 406, and one or more displays 408. The one or more processors 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the user device 400 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The user device 400 may additionally include, or be associated with, input device(s) such as a keyboard, a mouse, a pen, a voice input device, a touch input device, etc. The memory 404 may include a customer module 410 and a location module 412.

The customer module 410 (and/or the location module 412) may represent a customer-facing component that may generally be used by a customer. Although in some instances a merchant may interact with the customer-facing component (e.g., to confirm payment, provide delivery information, or provide other input). The customer module 410 may perform various processes to assist a customer in facilitating transactions with merchants. In doing so, the customer module 410 may provide various interfaces and/or dashboards. In some instances, the customer module 410 may be referred to as an application, such as an item acquisition application. Further, in some instances the customer module 410 may comprise a local application that operates in cooperation with a service provider associated with a merchant, such as a third party application 407, such as delivery services, to order pizza from a pizza merchant.

The customer module 410 may communicate with the service provider 102 to use delivery services associated with the service provider 102. As one example, a customer may interact with an item acquisition interface (e.g., the item acquisition interface 120) provided by the customer module 410 to place an order with a merchant. If the customer module 410 determines that a delivery may be requested (e.g., automatic determination based on a setting in a user profile or previous purchases, determination based on customer input indicating a desire to have the order delivered, etc.), the customer module 410 may generate a request for a delivery proposal and send the request to the service provider 102 via one or more APIs to request information regarding use of delivery service provided by the service provider 102. The information of the request may be provided by the customer, retrieved from a data source (e.g., a user profile, etc.), and so on. Although in many instances the customer module 410 provides the information included in a request for a delivery proposal, in some instances the information may be determined (at least in part) at the service provider 102 (e.g., the service provider 102 may receive an item identifier and lookup an item size/weight, the service provider 102 may identify the customer and look up preferences of the customer, etc.).

After submitting a request for a delivery proposal to the service provider 102, the customer module 410 may receive the delivery proposal from the service provider 102. In some instances, information from the delivery proposal is conveyed to the customer. For example, an item acquisition interface may display a cost of delivery, an estimated delivery time, and/or any other information. In other instances, information from the delivery proposal may not be presented to the customer. For example, the item acquisition interface may not display the cost of delivery as an itemized element, but include the cost of delivery in the total cost of the order. As such, in some instances it may appear to the customer that the delivery is being handled by the merchant. In any event, the customer module 410 may send an indication of acceptance or rejection of the delivery proposal to the service provider 102 via the one or more APIs.

The customer module 410 may also communicate with the service provider 102 via the one or more APIs to request and/or receive information on a status of a transaction. For example, the customer module 410 may receive information regarding a status of preparation of an item (e.g., almost finished, done, entering the oven, bagged and ready for pickup, etc.), a status of delivery by delivery services (e.g., a specific location of a courier, how far away a courier is, whether or not an item has been dropped off, courier is in-transit to the pick-up location, etc.), and so on. Such information may be presented to the customer. In one example, a map is displayed to the customer with an icon or other element indicating a location of the courier. Additionally, or alternatively, an advertisement may be displayed. To illustrate, the customer module 410 may display an advertisement for an online site associated with delivering items for merchants. The advertisement may encourage the customer to use the online site to place orders in the future, instead of placing an order with a merchant directly. Although in other illustrations, any type of advertisement may be displayed.

The customer module 410 may additionally, or alternatively, perform other processing. As one example, the customer module 410 may provide information via an interface regarding merchants that are within a predetermined proximity to a user. The user may select a merchant and order an item with the merchant. Additionally, or alternatively, the customer module 410 may enable the user to provide payment for an item (e.g., via a card reader, NFC connection to a merchant device, Bluetooth® connection to a merchant device, etc.), receive receipts for items, and so on. Further, the customer module 410 may enable the user to check-in to a merchant to carry out a card-less payment transaction.

The location module 412 may determine a location of the user device 400. In some instances, the location is provided to the service provider 102, or used locally, to facilitate various functions, such as processing of transactions when a customer is located within a particular proximity to a merchant device. The location module 412 may determine a geographic location of the user device 400 from geolocation techniques (e.g., satellite-based systems—global positioning system (GPS)), cell tower location data, wireless access point location data, wireless beacon location, and so forth. As such, the location module 412 may utilize data from a location sensor of the user device 400, such as a GPS receiver or communication interface that can determine (e.g., from cell towers or wireless access points) a geographic location of the user device 400.

In some implementations, the user device 400 is also configured to receive reservation proposal in response to a reservation request triggered through the user device 400, the merchant device 300, or automatically, for example through the service provider. The user of the user device 400 can approve or reject the reservation proposal. The user device 400 can also provide preferences of the kind of seating they would prefer either for a current reservation or a future reservation. The preferences may also include the chefs, items, merchant location, time of day, alternate merchants, cuisines of choice, etc., so that the service provider can generate alternatives for the user, for example in case a preferred reservation is not available or there is a conflict with another reservation from a different source.

Figure 5:
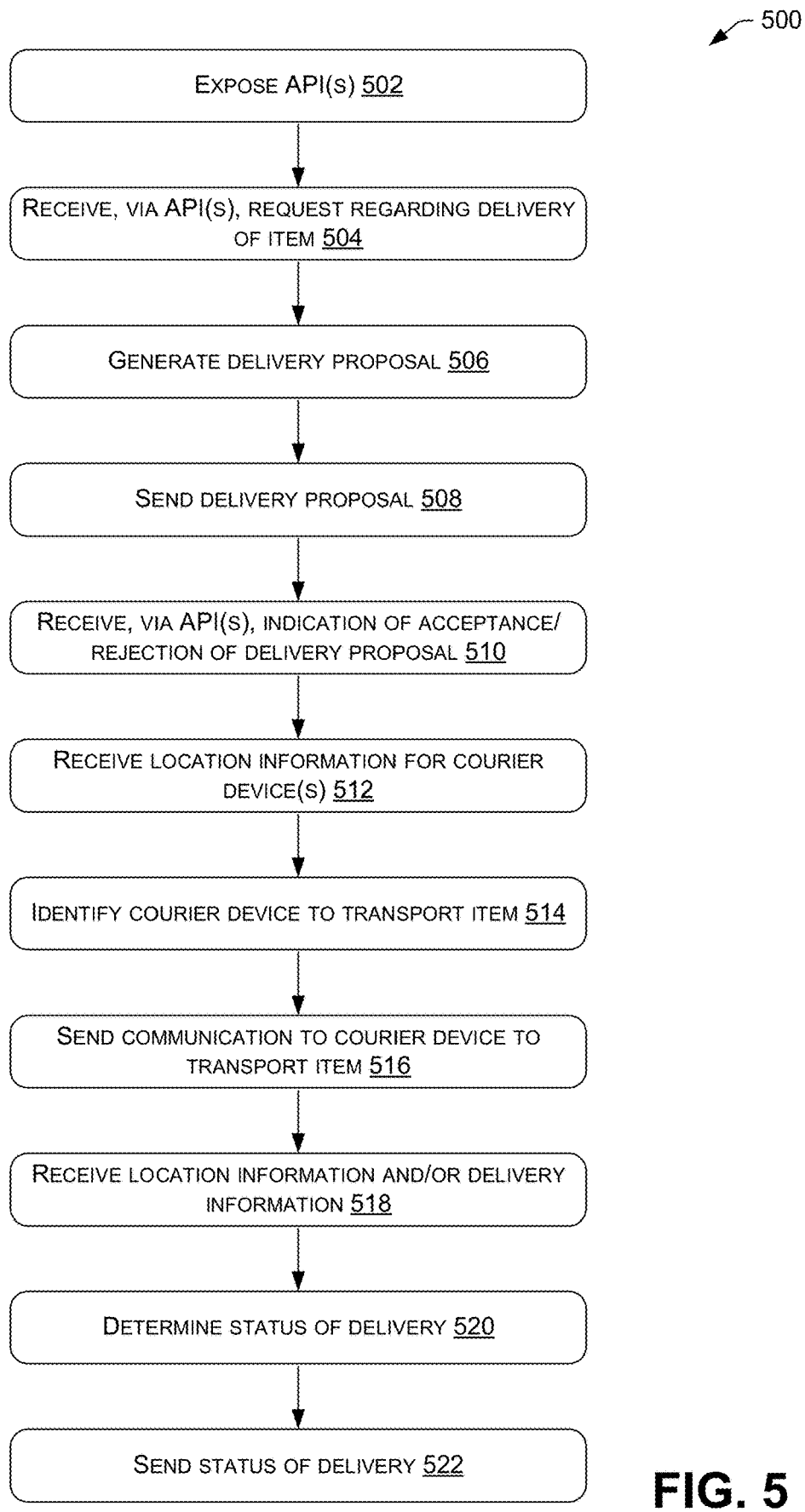
FIG. 5 illustrates an example process to expose one or more APIs to enable entities to use delivery services provided by a service provider.
Figure 6:
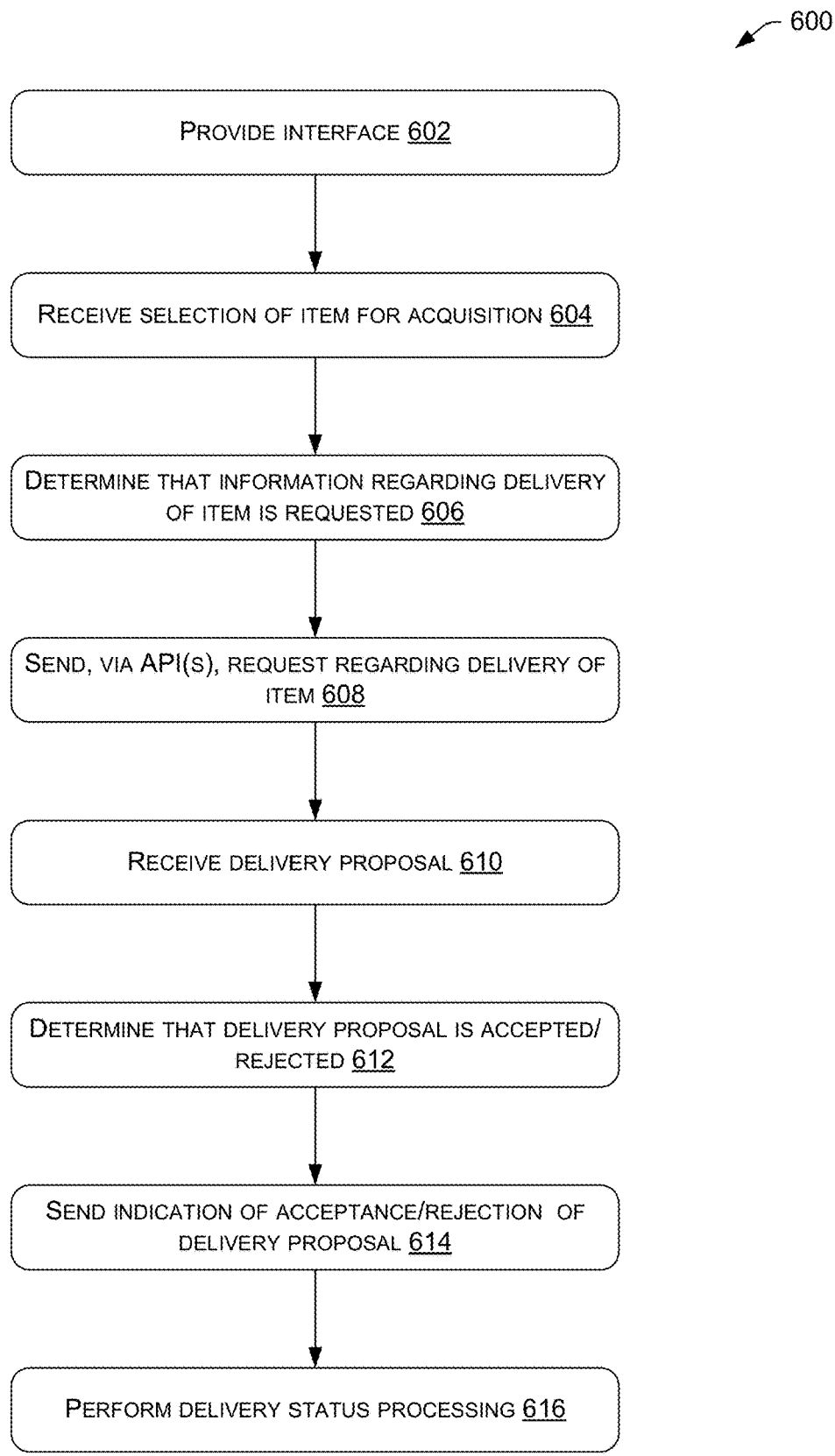
FIG. 6 illustrates an example process to communicate with a service provider via one or more APIs to use delivery services provided by the service provider.
Figure 7:
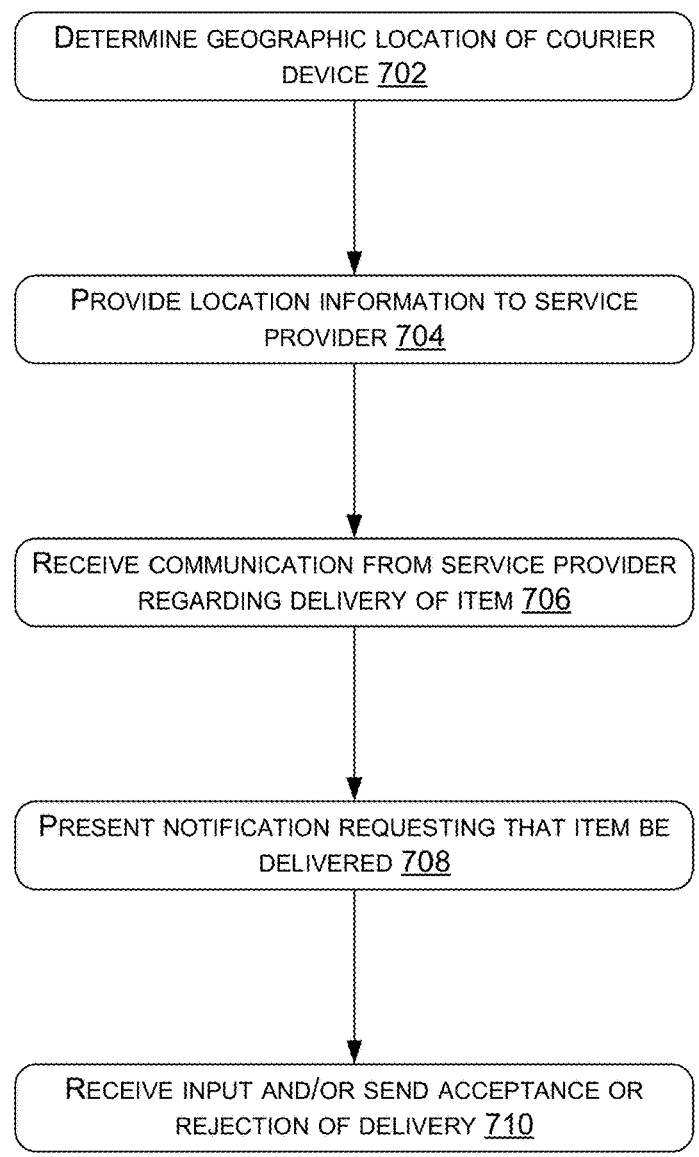
FIG. 7 illustrates an example process to notify a third party service regarding a delivery of an item.

FIGS. 5-7 illustrate example processes 500, 600, and 700 for employing the techniques described herein. For ease of illustration the processes 500, 600, and 700 may be described as being performed by a computing device described herein, such as the service provider 102, the merchant device 300, the user device 400, and/or the third party service device, which can be a user device. However, the processes 500, 600, and 700 may be performed by other devices. Moreover, the devices may be used to perform other processes.

The processes 500, 600, and 700 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted. In some examples, operations that are described in the processes 500, 600, and/or 700 as being performed by a device or service provider may be performed by an application running on the device or service provider.

FIG. 5 illustrates the example process 500 to expose one or more APIs to enable entities to use third party services associated with and other services provided by the service provider 102.

At 502, the service provider 102 may expose one or more APIs to provide a computing device with access to delivery resources of a delivery service that interfaces with a consensus service 207 of the service provider 102. For example, the service provider 102 may expose the one or more APIs to a computing device associated with a merchant and/or a customer to facilitate delivery of items offered by the merchant by a plurality of delivery platforms.

At 504, the service provider 102 may receive, via the one or more APIs, a request regarding delivery of an item. The request may be received from a computing device associated with a merchant or a customer. The request may indicate a location of delivery, a location of pick-up, a requested time of pick-up, a number of items being acquired, a size of the item, whether or not the item is associated with a predetermined category, a weight of the item, and so on. In some instances, the request is received from an application that is executable on a computing device associated with a merchant or a customer. The request may be for delivery of any type of item. In one example, the item may be a computing device (e.g., tablet, etc.) that is configured with a merchant application that facilitates acquisition of items with customer (e.g., a proprietary merchant application that may not be available to the general public). Here, the request may seek to deliver the item to a merchant to onboard the merchant (e.g., register) the merchant with a service provider to use purchasing resources provided by the service provider. The purchasing resources may be used as the merchant interacts with the delivered computing device. In other examples, the item may be other types of items.

At 506, the service provider 102 may generate a delivery proposal regarding delivery of an item or scheduling of order incase of multiple orders received from multiple third party services. The delivery proposal may include a cost for delivery of the item by the delivery service associated with the service provider 102, an estimated amount of time for delivery of the item by the delivery service, an estimated pick-up time for delivery of the item, an estimated drop-off time for delivery of the item, and so on. In some instances, the service provider 102 may determine the cost for delivery of the item (or any other information in the delivery proposal) based on a current location of a third party service, a location of pick-up of the item, a location of drop-off of the item, an estimated preparation time of the item by a merchant associated with the item, and so on. The delivery proposal may also include a sequence of orders for the kitchen display system so that the merchant can coordinate the order preparation accordingly.

At 508, the service provider 102 may send a delivery proposal to a computing device, such as a computing device associated with a merchant or a user.

At 510, the service provider 102 may receive, via the one or more APIs, an indication of acceptance or rejection of a delivery proposal. The indication of acceptance or rejection may be received from a computing device associated with a merchant or a user.

At 512, the service provider 102 may receive location information for couriers from third party service devices. The location information may be received at any time, through a different API than that used to communicate with a merchant or customer, through a non-API channel, and so on. The location information may identify a current location of a third party service device.

At 514, the service provider 102 may identify a third party service from amongst several third party services to transport the item. In many instances, such identification may be performed in response to receiving an indication of acceptance of a delivery proposal. The third party service device may be identified based on a variety of information, such as a location of the third party service device identified in the location information.

At 516, the service provider 102 may send a communication to a third party service device to transport an item. The communication may request that the associated third party service obtain the item from a location of pick-up and transport the item to a location of delivery. The communication may include various information about the delivery, such as information in a request for a delivery proposal, information in the delivery proposal, and so on. The communication may be sent through a different API than that used to communicate with a merchant or customer, through a non-API channel, and so on. In some instances, the service provider 102 may receive an indication of acceptance from the third party service device indication that the third party service will deliver the item.

At 518, the service provider 102 may receive location information and/or delivery information. The location information and/or delivery information may be received from a third party service device and/or a merchant device. In many instances, such information may be received after delivery has begun. The location information may generally indicate a location of the third party service. The delivery information may include, for example, input from a third party service indicating a location of the third party service, information from the third party service or merchant indicating that an item has been picked-up, and so on.

At 520, the service provider 102 may determine a status of delivery of an item being delivered. The status of delivery may be based on the location information and/or delivery information received at 822.

At 522, the service provider 102 may send a status of delivery to a computing device associated with a merchant or a customer. The computing device may display the status of delivery to the merchant or the customer.

In some instances, the service provider 102 may receive orders through multiple channels, or multiple sources, such as third party services. If an order is received though a non-merchant channel (e.g., directly from a customer), the service provider 102 may communicate with the merchant to request that the merchant fulfill the order. If accepted by the merchant, the merchant may send an indication of acceptance and the service provider 102 may proceed with facilitating delivery by a third party service. Further, a status of delivery may be determined for any number of deliveries that are in progress. In some instances, multiple statuses for multiple items with a single merchant or customer may be determined and sent to a merchant device or customer device.

FIG. 6 illustrates the example process 600 to communicate with the service provider 102 via one or more APIs to use third party services integrated with the service provider 102 to coordinate actions using consensus service. The process 600 is discussed in the context of being performed by an acquisition device, such as a computing device associated with a merchant or a customer.

At 602, the acquisition device may provide an interface, such as the item acquisition interface 120 of FIG. 1. This may include displaying the item acquisition interface via a display. The interface may enable a user to place an order for an item. The interface may also be a kitchen display system to enable a merchant to view orders, sequence in which they should be prepared, broken down by items, such that similar items may be clubbed to create a new ticket for internal kitchen purposes, and changing the flow for items that are no longer available and so on. The interface may also be to an interface of reservations, open and unavailable, showing which reservations are booked and from which source. The interface may also be an interface of items currently available at the merchant, with the merchant able to change the menu in real-time based on availability, popularity, location of the merchant, etc.

At 604, the acquisition device may receive a selection of an item for acquisition. For example, a user (e.g., merchant, customer, etc.) may place an item in an electronic shopping cart to indicate an intention of purchasing the item from a merchant. In some instances, the user may also provide other information, such as a location of delivery, a location of pick-up, a requested time of pick-up, a number of items being acquired, a size of the item, whether or not the item is associated with the predetermined category, a weight of the item, and so on. In other instances, such information may be determined automatically. The other kind of requested information may be request for order collation, order sequencing, or order consensus triggered by the merchant or automatically by the server.

At 606, the acquisition device may determine that information regarding delivery of an item is requested. This may include receiving input from a user indicating an interest in having the item delivered, identifying a distance between a location of a customer and a location of a merchant (e.g., if the distance is greater than a threshold, determine that delivery is being requested), and so on. In some instances, it may automatically be determined that delivery information is being requested for each order.

At 608, the acquisition device may send, via one or more APIs associated with the service provider 102 and to the service provider 102, a request regarding delivery of an item. Such request may request a delivery proposal. In some instances, the request may indicate a location of delivery, a location of pick-up, a requested time of pick-up, a number of items being acquired, a size of the item, whether or not the item is associated with a predetermined category, a weight of the item, and so on. The delivery proposal also includes reservation proposals, how to distribute the reservation quota among third party services, how to distribute acceptance or delivery of orders among third party services, how to sequence orders received from the third party services, and how to send or receive updates to orders, such as menu updates, order updates, etc.

At 610, the acquisition device may receive a delivery proposal from the service provider 102. The delivery proposal may indicate a cost for delivery of the item by a delivery service associated with the service provider 102, an estimated amount of time for delivery of the item, an estimated pick-up time for delivery of the item, an estimated drop-off time for delivery of the item, and so on.

At 612, the acquisition device may determine that a delivery proposal is accepted or rejected. In some instances, the acquisition device may display information included within the delivery proposal (e.g., a cost for delivery of an item, an estimated amount of time for delivery of the item, etc.) and receive user input regarding acceptance of the delivery proposal. In other instances, the acquisition device may automatically determine to accept or reject the delivery proposal when one or more criteria are satisfied. As such, the acquisition device may refrain from displaying information of the delivery proposal, in some instances.

At 614, the acquisition device may send an indication of acceptance or rejection of a delivery proposal to the service provider 102 via one or more APIs associated with the service provider 102. This may cause the service provider 102 to facilitate delivery of an item. In some instances, the customer may be charged for the delivery, while in other instances the merchant or others may be charged.

At 616, the acquisition device may perform delivery status processing. For example, the acquisition device may send, via one or more APIs associated with the service provider 102, a request for a delivery status of an item. Thereafter, the acquisition device may receive, from the service computing device 102, a status of delivery of the item and display the status of delivery. In other examples, a status of delivery may be determined at a merchant device (e.g., based on knowing that a third party service picked-up an item), and the status of delivery may be sent to a customer device.

FIG. 7 illustrates the example process 700 to notify a third party service or a merchant device regarding a delivery of an item, reservation of an open/conflicting seat, menu update, and so on.

At 702, the third party service device may determine a geographic location of the third party service device, such as a user device. The geographic location may be determined based on data from a location sensor of the third party service device, such as a satellite-based sensor (e.g., Global Position System (GPS), cell tower radio, wireless access point radio, wireless beacon location sensor, and so forth).

At 704, the third party service device may provide location information to a service computing device 102. The location information may indicate the geographic location of the third party service device. The location information may be provided periodically, at a particular time, upon request, and so on.

At 706, the third party service device may receive a communication from the service provider 102 regarding delivery of an item. For example, the communication may include a request for a third party service associated with the third party service device 500 to obtain an item from a merchant and transport the item to a customer. The request may specify a time frame for the delivery (e.g., a delivery time), a number of items to delivery, a route of delivery, a location(s) of a merchant, or any other information that may be useful in making the delivery.

At 708, the third party service device may present a notification requesting that an item be delivered (e.g., obtained from an establishment of a merchant and transported to a location of delivery). The notification may be presented via a display, a speaker, and so on. In some instances, the information is displayed via a third party service interface that facilitates deliveries of items (e.g., an interface that enables the third party service to accept deliveries, acknowledge that deliveries have been made, request additional deliveries, etc.). The third party service device 500 may present any information that is included in the communication that is received at 1006.

At 710, the third party service device may receive input from the third party service and/or send acceptance or rejection regarding delivery of an item. For example, if the input indicates that the third party service accepts a task of delivering items to a customer, the third party service device 500 may send a communication to the service provider 102 indicating that such task has been accepted.

Figure 8:
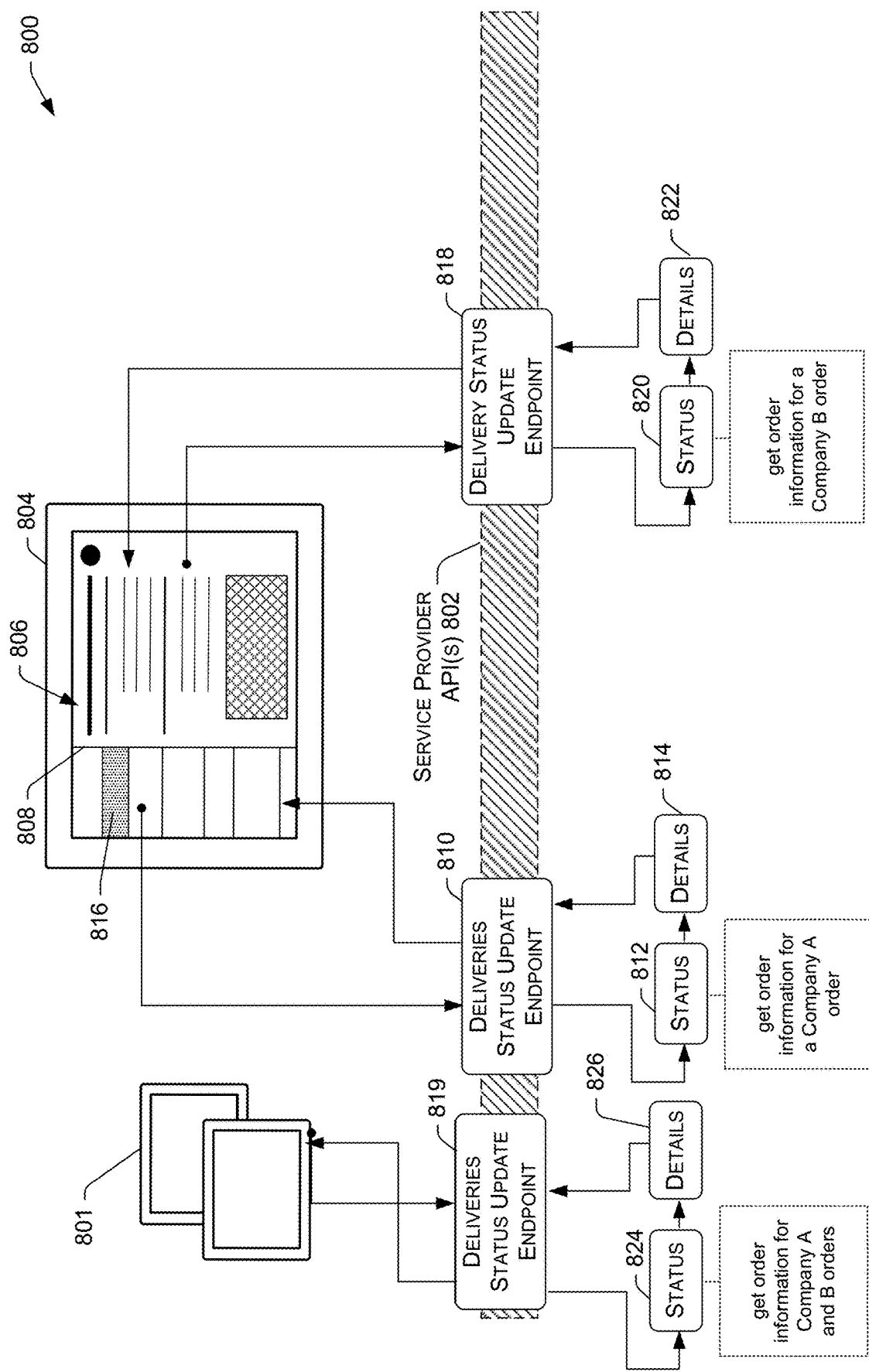
FIG. 8 illustrates an example process of communicating via one or more APIs exposed by a service provider to provide status updates regarding orders.

FIG. 8 illustrates an example process 800 of communicating via one or more APIs exposed by a service provider to provide status updates regarding orders. In FIG. 8, elements that are illustrated on the bottom portion of FIG. 8 (below a line established by one or more service provider APIs 802) may represent operations performed by a service provider, such as the service provider 102.

In the example of FIG. 8, a computing device 801 associated with a user executing a plurality of third party services allow generation or creation of orders placed with the merchant associated with merchant device 106 and computing device 804 associated with a third party service implements a user interface 806 to allow generation or creation of orders placed with the merchant associated with merchant device 106. The orders coming in or orders that are listed on the left side of the user interface 806 may be obtained by requesting the information from the service provider, as illustrated at 810. At 812, the service provider may determine statuses of the orders by obtaining fulfillment information and determining locations of third party services assigned to each of the orders for the merchant (Company A). At 814, the service provider may generate the details regarding the statuses and send the details to the computing device 804 for display via the left side of the user interface 1206.

The customer may generate the orders or order requests using the computing device(s) 801. Accordingly, the third party services 108 executing on the computing device 801 may be used to trigger such orders. The third party applications, such as third party apps 108, interface with the service provider 102 though deliveries status update endpoint, or API endpoints 819, to both get details of orders 826, how their order is scheduled in a list of orders received from everywhere, the status of preparation and delivery 824, and so on. The service provider can also schedule the orders to be delivered by companies different from the ones that were used to place the order, for example based on proximity of a user to a courier belonging to another delivery company.

The computing device 802 associated with the merchant is also shown. A left side of the user interface 806 may display relatively high level information of all orders (or a particular number of orders) that have been placed with the merchant, regardless of a channel from which the orders are placed (e.g., telephone, customer application, website, etc.). Meanwhile, a right side of the user interface may display more detailed information for one or more selected orders. The left and right sides of the user interface 806 are separated by a line 808. The user interface 806 may also be an interface of a kitchen display system where the service provider pushes notifications or updates in real time from orders being received from multiple sources. The interface 806 also lists the orders, as scheduled by the service provider 102, to assist management of orders as per user preferences, availability, and other such factors.

As illustrated, status information regarding a delivery of an item may be obtained by communicating with the service provider via the one or more service provider APIs 802. For example, status information for orders that are listed on the left side of the user interface 806 may be obtained by requesting the information from the service provider, as illustrated at 810. At 812, the service provider may determine statuses of the orders by obtaining fulfillment information and determining locations of third party services assigned to each of the orders for the merchant (Company A). At 814, the service provider may generate the details regarding the statuses and send the details to the computing device 804 for display via the left side of the user interface 806.

If the merchant selects a particular order on the left side of the user interface 806, such as order 816, more detailed information that is specific to that order may be displayed on the right side of the user interface 806. In particular, the computing device 804 may request additional status information regarding the selected order 816, as illustrated at 818. At 820, the service provider may determine a status of the selected order by obtaining fulfillment information and determining a location of a third party service assigned to the selected order. At 822, the service provider may generate the details regarding the status and send the details to the computing device 804 for display via the right side of the user interface 1206. In some instances, the details displayed on the right side may be more specific than those displayed on the left side. As such, the merchant many view status information of orders placed through various types of channels.

In some instances, the box 810 represents an API for obtaining status information for all orders (or a particular number of orders) of a merchant that are currently being delivered by the delivery services of the service provider. Meanwhile, the box 818 may represent an API for obtaining status information for a specific order of a merchant that is currently being delivered by the delivery services of the service provider.

In some instances, the current application discloses a system for providing optimized order scheduling, the system comprising one or more processors; and one or more non-transitory computer-readable media storing instructions executable by the one or more processors, wherein the instructions program the one or more processors to perform acts comprising receiving, by an order scheduling application executing on a point of sale device associated with a merchant, a first order from a first customer-facing order application, the first order comprising one or more menu items to be prepared by the merchant for delivery to an address provided by the first customer-facing order application; sending, by the first delivery application and to the computing device of the merchant, an estimated pick-up time indicating the time when the first delivery application estimates arrival of a courier or the customer to pick-up the first order; determining, based on past orders involving the first customer-facing application, a predicted pick-up time indicating an estimated time for when a courier or the customer is likely to pick-up the first order; receiving, by the order scheduling application and from another customer, a second order from a second customer-facing order application, the second order comprising one or more menu to be prepared by the merchant; sending, by the first delivery application and to the computing device of the merchant, an estimated pick-up time indicating the time when the second delivery application estimates arrival of the courier or the other customer to pick-up the second order; determining, based on past orders involving the second delivery application, a predicted pick-up time indicating the time when the courier or the customer is likely to pick-up the second order; generating, by the order scheduling application, a sequenced list of orders based at least in part on the predicted pick-up times of the first order and the second order; and sending the sequenced list of orders to a kitchen display system for preparation of the orders as per the sequenced list.

Figure 9:
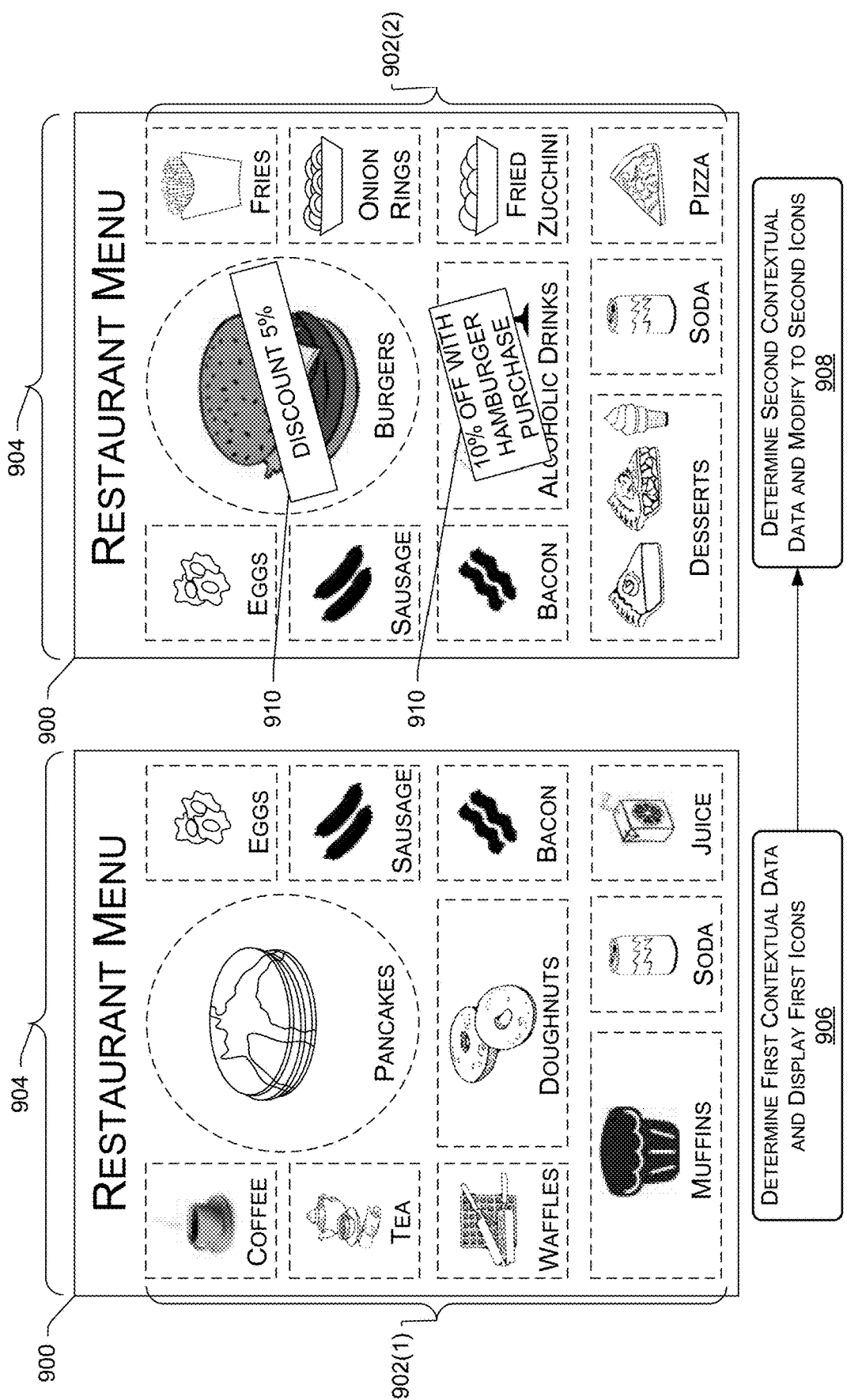
FIG. 9 illustrates an example data flow diagram indicating the process of harmonizing menu items across third party services, and for dynamically modifying icons of a user interface based on contextual data, and harmonizing menu items across different services.

FIG. 9 illustrates an example process of an example service provider, such as service computing device 102 or an associated application such as consensus service, dynamically modifying icons 902 of a user interface 904, such as user interface, based on contextual data. For example, the menu updates can be sent to the third party services based on the relationship between the third party service and the merchant, the availability or popularity of items, and other contextual data. Contextual data can include a location of the service computing device 900, a time of day, a day of the week, time of year (e.g., season), weather, merchant inventory, merchant preferences, customer preferences, items that are deemed upsell items, items that are deemed cross-sell items, a sale and/or special offered by the merchant, and various other contextual factors corresponding to the use of the service computing device 900. The contextual data can either be manually generated at a merchant device, through an application, or automatically through data analysis, for example current or historical, at the server level. The contextual information can be obtained by tracking order requests, complete or incomplete that is cart level information, from the third party applications.

At 906, the service computing device 900 determines first contextual data and displays first icons 902(1) based on the contextual data. The first contextual data can be determined based on an analysis of one or more factors corresponding to the use of the service computing device 900. In the illustrative example, the analysis can include a determination that a time of day corresponds to a breakfast menu. Based on this determination, the service computing device 900 can display a first set of icons 902(1) corresponding to the breakfast menu. In some examples, the analysis can include an analysis of customer preferences, and a determination that the customer prefers particular menu items, such as the breakfast menu.

In various examples, the analysis can include a determination to emphasize one or more items. The emphasis can be presented by increasing a size, shape, color and/or hue of the icon 902, changing a placement of the icon 902, or any other adjustments to make the icon 902 stand out on the display. The emphasis can be based on merchant inventory, current weather, an attempt to upsell an item, an attempt to cross-sell an item, sales and/or specials offered by the merchant, transaction history of the merchant (e.g., known popular items sold at a time of day, a day of the week, time of year (e.g., season), known popular combinations of items sold, etc.

In some examples, the analysis can include a determination to de-emphasize one or more items. A de-emphasis of an item can be based on merchant inventory, current weather, an attempt to cross-sell, and/or other factors in which the merchant may discourage the sale of a particular item. The de-emphasis can be presented by removing the icon 902 corresponding to the one or more items from the display page. In various examples, the user interface 904 can include multiple display pages. In some examples, the de-emphasis can be presented by including the icon corresponding to the one or more items on a display page other than a main display page. For example, the de-emphasis can include presenting the icon on a last page of the multiple display pages.

In various examples, the service computing device 900 can dynamically determine to emphasize and/or de-emphasize one or more items based on contextual factors. For example, if a customer orders the last muffin, the service computing device 900 can dynamically modify the user interface 904 by removing the muffin icon from the user interface, and replace it with a pastry icon.

At 908, the service computing device 900 determines second contextual data and displays second icons 902(2) based on the contextual data. In various examples, the second contextual data can include a change in the time of day from a time corresponding to the breakfast menu to a time corresponding to a lunch menu. In some examples, the second contextual data can include a determination of an event nearby the merchant location, or displayed on a screen at the merchant location, which could affect menu items most likely to be ordered by customers. In such examples, the service computing device 900 could dynamically modify the icons 902(1) to a second set of icons 902(2) to cater to the customer preferences or external environment (e.g., cold/hot day recommend hot/cold beverage items). For example, a merchant may typically adjust from a breakfast to a lunch menu at 11 am. However, the service computing device 900 may determine that a football game starts at 10 am, and during football games, the customers prefer to consume items on the lunch menu. Accordingly, the service computing device 900 may adjust one or more of the icons 902 to those corresponding to lunch menu items.

In some examples, the service computing device 900 may determine that an event is taking place nearby the merchant or will be presented on a display screen at the merchant location, and may generate one or more sales and/or specials (e.g., discounts, etc.) based on the event. In such examples, the service computing device 900 can emphasize the icons 902 corresponding to the one or more specials. For example, the merchant may offer hamburgers and alcoholic beverages on special during the event. Accordingly, the service computing device 900 can modify the icons corresponding to the hamburgers and alcoholic beverages to make them stand out. Additionally or alternatively, the service computing device may display a notification 910 that the particular items are offered at a discounted price to further incentivize the purchase.

Alternatively or additionally, the first interface with icons 902(1) may correspond to a first third party service, while the second interface with 902(2) may correspond to a second third party service, where the merchant sends different updates to the menu interface. In another implementation, the interfaces for both the one and another third party services are the same, which means the same content is presented to the third party services. The contextual information, on which the menus are based, may be tied to customer behavior with the menu associated with third-party service (i.e., service A's menu for a merchant may be organized differently than service B's menu for the same merchant). The payment service's API may be used to gather customer interaction/behavior within that third party service application (e.g., menu scrolling activity, navigation preferences, ordering history, and so on). Looking at ordering history, the payment service can use that information to reorganize the menu, for example, if the payment service, or API determines that customers of service A typically order appetizers while service B's customers tend to order desserts from a particular merchant. So in one embodiment, the payment service can push up content/menu updates to all third party ordering applications, for example based on ordering activity that the consensus service tracks during a specific time period (e.g., based on a query: "are customers from the majority of third party apps ordering steaks right now?"). Additionally or alternatively, the payment service can also push out content updates that reorganize the menu layout so as to generate unique menus that are customized to each third party app based on what the consensus service learns about their customer's ordering behavior. Thus, the consensus service are gathers, analyzes, compares, and learns from current data and historical data that a delivery service would otherwise not have access to. Furthermore, the consensus service allows distinct services which otherwise do not communicate, to communicate through indirect channels created by the consensus service. While the description discusses API to be one form of channels, it will be understood that the description can be extended to cover other forms of channels between the services either directly or through an intermediary service, like the payment service.

In some implementations, the server system for providing optimized content management, the system comprising one or more processors; one or more non-transitory computer-readable media storing instructions executable by the one or more processors, for executing process steps such as: receiving content structures for the first service application and the second service application, wherein content structures include, for example the manner in which the menus are laid out or items are priced; receiving, by content management application executing on a point of sale device associated with a merchant, a first content update or review for a first merchant application where the content update includes new menu items, deleted menu items, the first content update comprising updates made to the content, such as menu, for the first service application; sending, to the first service application, the content updates; and sending, to the second service application, the content updates similar to the content updates of the first service application.

Alternatively, the service provider includes generating, by the content management application, a configured structure of content based on the service application and merchants. For example, a first menu with a certain order and pricing of items for a first service application, and a second menu with another orders and pricing of items for a second service application. Further, different items may be offered at different locations and service applications.

Figure 10:
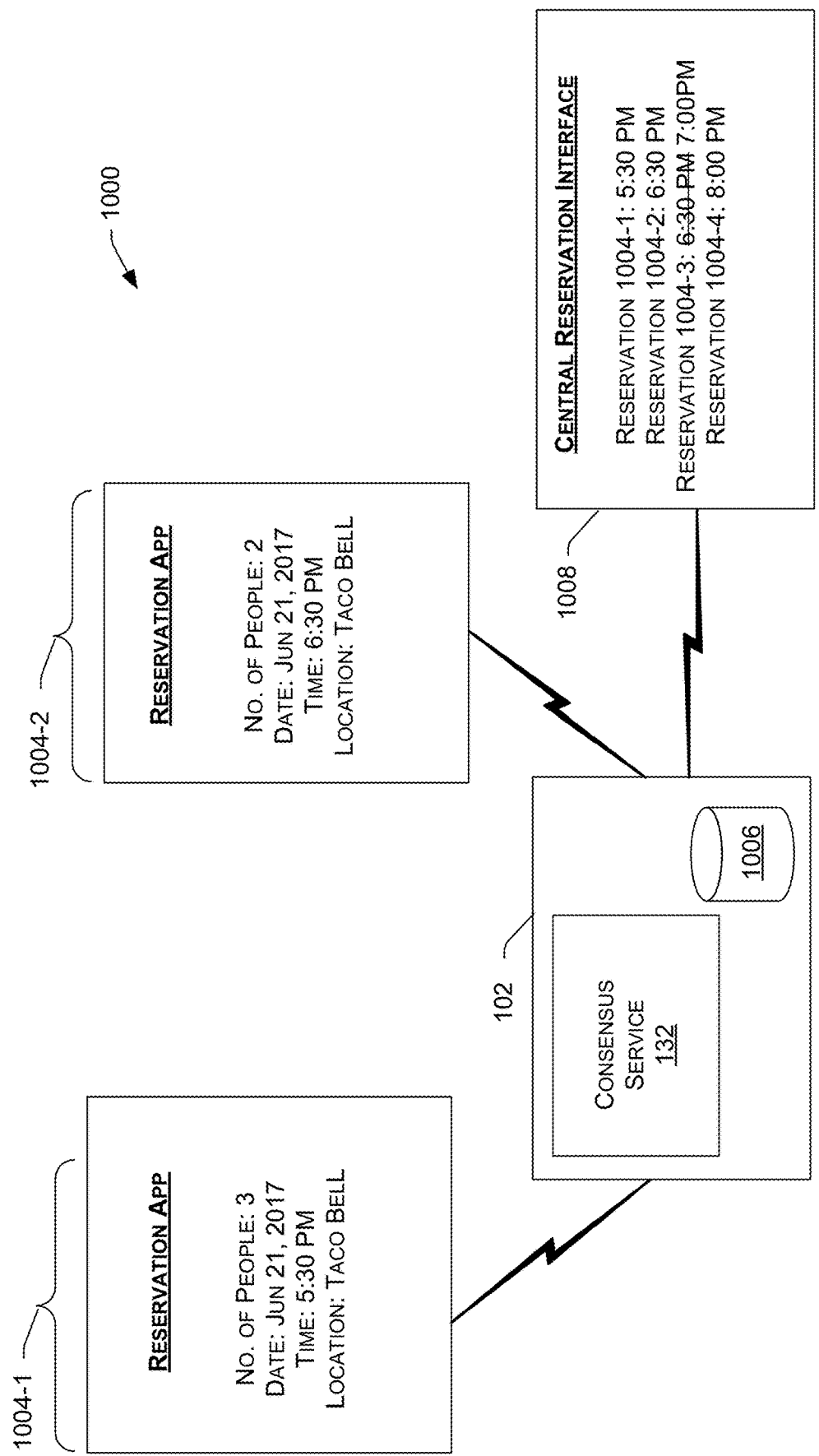
FIG. 10 illustrates an example data flow diagram indicating the process of harmonizing reservations and allocating unfilled or overlapping reservations originating from multiple third party services.

FIG. 10 is an example interface 1000 of reservations on a consensus service 132 at a service provider 102 or a merchant device 1008 executing the consensus service. As shown in the figure, the reservations can be managed in real-time, where the reservations are received from multiple sources, such as reservation services such as Yelp©, OpenTable©, Resy©, and so on.

In some implementations, the service provider 102 allocates reservations received for a merchant device 1002, which is configured to receive reservations from a plurality of reservation applications including a first reservation application 1004-1 and a second reservation application 1004-2 via an API (not shown). The API may be used to facilitate the payment service as an aggregator that, for example aggregates data from various reservation applications and these third-party apps send reservation information to the merchant using the exposed API. The consensus service, for example, can gather data and sequence the reservations accordingly. The consensus service can also leverage historical reservation information that the service learns about each reservation application and allocate portions of seats based on what the service has learned, for example through machine learning models. For example, based on factors, such as frequency of cancellations, average time of arrival of customers using that application, order size, etc., the payment service can allocate seats. The service provider 102 receives multiple reservations and executes the consensus service 132 to process the incoming reservations and schedule them for the merchant based on customer profiles and/or merchant profiles stored in the database 1006. The database 1006 stores preferences of the customers and merchants to indicate how the reservations can be configured to best match their preferences. For example, the consensus service 132 may move a reservation 1004-3 from 6:30 to 7 PM depending on availability or past reservations made by the customer. Similarly, the reservation 1004-4 may be assigned to 8 PM depending on availability of a particular seat or item. For example, some restaurants maintain a rotating menu and as such the service provider may be provided, by user's consent, access to user's dietary preferences. Accordingly, the reservation can be moved to a more preferred spot without user or merchant intervention. This, the instant application discloses a method for receiving, by a payment service, such as a service provider, and from the first reservation application, first data associated with an average number of reservations made using the first reservation application over a period of time; receiving, by the payment service and from the second reservation application, second data associated with an average number of reservations made using the second reservation application over the period of time; receiving, by the payment service, data regarding available seats at the restaurant; allocating to the first reservation application, a first portion of seats from the available seats, based at least on first data, wherein one or more users of the first reservation application can reserve seats not more than the first portion of seats; allocating, to the second reservation application, a second portion of seats of the available seats, based at least on the second data, wherein one or more users of the second reservation application can reserve seats not more than the other portion of seats; during reservation and in response to at least one the one or more users being unable to reserve a seat using the first reservation application, determining whether any seats are available on the second reservation application; providing instructions to transitioning the customer device from an interface of the first reservation application to the second reservation application; and receiving an input from the one or more users indicating reservation of the seat in the restaurant using the second reservation application.

In some implementations, the server system for providing optimized restaurant reservation scheduling, the system comprising one or more processors; one or more non-transitory computer-readable media storing instructions executable by the one or more processors, wherein the instructions program the one or more processors to perform acts comprising: receiving, by an reservation scheduling application executing on a point of sale device associated with a merchant, a first reservation from a first customer-facing reservation application, the first reservation comprising one or more menu items to be prepared by the merchant for delivery to an address provided by the first customer-facing reservation application; sending, by the first delivery application and to the computing device of the merchant, an estimated pick-up time indicating the time when the first delivery application estimates arrival of a courier or the customer to pick-up the first reservation; determining, based on past reservations involving the first customer-facing application, a predicted pick-up time indicating an estimated time for when a courier or the customer is likely to pick-up the first reservation; receiving, by the reservation scheduling application and from another customer, a second reservation from a second customer-facing reservation application, the second reservation comprising one or more menu to be prepared by the merchant; sending, by the first delivery application and to the computing device of the merchant, an estimated pick-up time indicating the time when the second delivery application estimates arrival of the courier or the other customer to pick-up the second reservation; determining, based on past reservations involving the second delivery application, a predicted pick-up time indicating the time when the courier or the customer is likely to pick-up the second reservation; generating, by the reservation scheduling application, a sequenced list of reservations based at least in part on the predicted pick-up times of the first reservation and the second reservation; and sending the sequenced list of reservations to a kitchen display system for preparation of the reservations as per the sequenced list.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:
a service computing device including a service computing device processor and a service computing device communication interface communicatively coupled to the service computing device processor, the service computing device communication interface for communicating over one or more networks with a plurality of third party service devices, and further for communicating over the one or more networks via one or more first Application Programming Interfaces (APIs) with a computing device associated with at least one of a customer or a merchant, the service computing device being configured to:
receive, via the one or more first APIs provided by the service computing device, a request for content update, wherein the content update is configured for delivery to a customer-facing application and is related to one or more menu items offered by the merchant, the request being generated via the one or more first APIs from an application that is executable on the computing device associated with at least one of the customer or the merchant;
determine, via the one or more first APIs, that the content update applies to other customer-facing applications, wherein the other customer-facing applications are interfaced with the application through one or more second APIs;
determine that the content update is to be sent to a targeted customer-facing application of the other customer-facing applications;
on determining that the content update is to be sent to the targeted customer-facing application, generate, for the merchant, a proposal for delivering the content update to the targeted customer-facing application, the proposal including: a nature of the content update indicating urgency with which to apply the content update and an estimated amount of time for delivery of the content update;
cause an interface of the targeted customer-facing application to be updated as per the content update; and
send, using the one or more first APIs and to a display system associated with the merchant, a notification indicating that the targeted customer-facing application has received the content update.

2. The system as claim 1 recites, wherein the service computing device is further configured to:
provide an interface to at least one of the customer or the merchant via a display associated with the computing device; and
cause to present, via the interface, the notification indicating that the targeted customer-facing application has received the content update.

3. The system as claim 1 recites, wherein the service computing device is further configured to:
determine that the content update was sent to at least one additional customer-facing applications of the other customer-facing applications in addition to the targeted customer-facing application; and
rescind, via the one or more second APIs and by the service computing device, the content update from the at least one additional customer-facing application.

4. The system as claim 1 recites, wherein the content update comprises a first content update, and wherein the service computing device is further configured to:
receive, via the one or more first APIs and via a consensus application executing on the service computing device, a plurality of requests for additional content updates including the request for the first content update, and wherein the consensus application selects the content update from the additional content updates based on the customer preferences.

5. The system as claim 1 recites, wherein determining that the content update is to be sent to a targeted customer-facing application is based at least in part on an inventory database.

6. The system as claim 1 recites, wherein the display system comprises a kitchen display system.

7. The system as claim 1 recites, wherein the targeted customer-facing application communicates with the merchant via the one or more second APIs.

8. A method comprising:
receiving, by the service computing device and via one or more first Application Programming Interfaces (APIs) provided by the service computing device, a request for content update, wherein the content update is configured for delivery to a customer-facing application and is related to one or more menu items offered by a merchant, the request being generated via the one or more first APIs from an application that is executable on a computing device associated with at least one of a customer or the merchant;
determining, by the service computing device and via the one or more first APIs, that the content update applies to other customer-facing applications, wherein the other customer-facing applications are interfaced with the application through one or more second APIs;
determining, by the service computing device, that the content update is to be sent to a targeted customer-facing application of the other customer-facing applications;
on determining, by the service computing device, that the content update is to be sent to the targeted customer-facing application, generating, by the service computing device and for the merchant, a proposal for delivering the content update to the targeted customer-facing application, the proposal including: a nature of the content update indicating urgency with which to apply the content update and an estimated amount of time for delivery of the content update;
causing, by the service computing device, an interface of the targeted customer-facing application to be updated as per the content update; and
sending, by the service computing device and using the one or more first APIs and to a display system associated with the merchant, a notification indicating that the targeted customer-facing application has received the content update.

9. The method as claim 8 recites, further comprising:
providing, by the service computing device, an interface to at least one of the customer or the merchant via a display associated with the computing device; and
causing to present, by the service computing device and via the interface, the notification indicating that the targeted customer-facing application has received the content update.

10. The method as claim 8 recites, further comprising:
    determining, by the service computing device, that the content update was sent to at least one additional customer-facing application of the other customer-facing applications in addition to the targeted customer-facing application; and
    rescinding, by the service computing device and via the one or more second APIs, the content update from the at least one additional customer-facing application.

11. The method as claim 8 recites, wherein the content update comprises a first content update, and the method further comprising:
    receiving, via the one or more first APIs and via a consensus application executing on the service computing device, a plurality of requests for additional content updates including the request for the first content update, and wherein the consensus application selects the content update from the additional content updates based on the customer preferences.

12. The method as claim 8 recites, wherein determining that the content update is to be sent to a targeted customer-facing application is based at least in part on an inventory database.

13. The method as claim 8 recites, wherein the display system comprises a kitchen display system.

14. The method as claim 8 recites, wherein the targeted customer-facing application communicates with the merchant via the one or more second APIs.

15. One or more non-transitory computer-readable media storing executable instructions that, when executed by one or more processors, cause the one or more processors to perform operations comprising:
    receiving, via one or more first Application Programming Interfaces (APIs), a request for content update, wherein the content update is configured for delivery to a customer-facing application and is related to one or more menu items offered by a merchant, the request being generated via the one or more first APIs from an application that is executable on a computing device associated with at least one of a customer or the merchant;
    determining, via the one or more first APIs, that the content update applies to other customer-facing applications, wherein the other customer-facing applications are interfaced with the application through one or more second APIs;
    determining that the content update is to be sent to a targeted customer-facing application of the other customer-facing applications;
    on determining that the content update is to be sent to the targeted customer-facing application, generating, for the merchant, a proposal for delivering the content update to the targeted customer-facing application, the proposal including: a nature of the content update indicating urgency with which to apply the content update and an estimated amount of time for delivery of the content update;
    causing an interface of the targeted customer-facing application to be updated as per the content update; and
    sending, using the one or more first APIs and to a display system associated with the merchant, a notification indicating that the targeted customer-facing application has received the content update.

16. The one or more non-transitory computer-readable media as claim 15 recites, the operations further comprising:
    providing an interface to at least one of the customer or the merchant via a display associated with the computing device; and
    causing to present, via the interface, the notification indicating that the targeted customer-facing application has received the content update.

17. The one or more non-transitory computer-readable media as claim 15 recites, the operations further comprising:
    determining that the content update was sent to at least one additional customer-facing application of the other customer-facing applications in addition to the targeted customer-facing application; and
    rescinding, via the one or more second APIs, the content update from the at least one additional customer-facing application.

18. The one or more non-transitory computer-readable media as claim 15 recites, wherein the content update comprises a first content update, and the operations further comprising:
    receiving, via the one or more first APIs and via a consensus application, a plurality of requests for additional content updates including the request for the first content update, and wherein the consensus application selects the content update from the additional content updates based on the customer preferences.

19. The one or more non-transitory computer-readable media as claim 15 recites, wherein the targeted customer-facing application communicates with the merchant via the one or more second APIs.

20. The one or more non-transitory computer-readable media as claim 15 recites, wherein the proposal further includes an identifier associated with a third party service associated with the targeted customer-facing application.

* * * * *